United States Patent
Smith et al.

(10) Patent No.: US 11,772,283 B2
(45) Date of Patent: Oct. 3, 2023

(54) CLUTCHED JOINT MODULES HAVING A QUASI-PASSIVE ELASTIC ACTUATOR FOR A ROBOTIC ASSEMBLY

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 303 days.

(21) Appl. No.: 17/087,544

(22) Filed: Nov. 2, 2020

(65) Prior Publication Data
US 2021/0046660 A1 Feb. 18, 2021

Related U.S. Application Data

(62) Division of application No. 15/810,102, filed on Nov. 12, 2017, now Pat. No. 10,821,614.

(Continued)

(51) Int. Cl.
*B25J 18/04* (2006.01)
*B25J 19/00* (2006.01)
(Continued)

(52) U.S. Cl.
CPC ......... *B25J 19/0041* (2013.01); *B25J 9/0006* (2013.01); *B25J 17/0241* (2013.01);
(Continued)

(58) Field of Classification Search
CPC .... B25J 9/1025; B25J 19/0041; B25J 9/0006; B25J 27/0241; F16D 27/14; F16D 23/12
(Continued)

(56) References Cited

U.S. PATENT DOCUMENTS

| 1,880,138 A | 9/1932 | Franz |
| 2,850,189 A | 9/1958 | Leroy |

(Continued)

FOREIGN PATENT DOCUMENTS

| CN | 101214653 A | 7/2008 |
| CN | 101823517 A | 9/2010 |

(Continued)

OTHER PUBLICATIONS

International Search Report for International Application No. PCT/US2021/062051 dated Mar. 16, 2022, 29 pages.

(Continued)

*Primary Examiner* — Randell J Krug

(57) ABSTRACT

A method for operating a robotic joint of a robotic system comprising selectively operating a clutch mechanism of a clutched joint module in an engaged state to cause a quasi-passive elastic actuator to enter an elastic state, the clutched joint module operating about and defining a joint of the robotic system. The method comprising effecting a first rotation of the joint to cause the quasi-passive elastic actuator to store energy during at least a portion of the rotation of the joint. The method comprising effecting a second rotation of the joint and causing the stored energy from the quasi-passive elastic actuator to be released in the form of an augmented torque applied to an output member of the clutched joint module. The method comprising selectively operating the clutch mechanism in a disengaged state to cause the quasi-passive elastic actuator to enter an inelastic state. The method comprising effecting a third rotation of the joint, wherein the quasi-passive elastic actuator facilitates a free swing mode of the clutched joint module and the joint.

15 Claims, 22 Drawing Sheets

Related U.S. Application Data

(60) Provisional application No. 62/421,175, filed on Nov. 11, 2016.

(51) Int. Cl.

| | | |
|---|---|---|
| *B25J 9/00* | (2006.01) | |
| *B25J 17/02* | (2006.01) | |
| *F16D 23/12* | (2006.01) | |
| *F16D 27/14* | (2006.01) | |
| *F16H 1/28* | (2006.01) | |

(52) U.S. Cl.
CPC ............ *F16D 23/12* (2013.01); *F16D 27/14* (2013.01); *F16H 1/28* (2013.01)

(58) Field of Classification Search
USPC ...................... 74/490.05, 665 R, 661; 185/45
See application file for complete search history.

(56) References Cited

U.S. PATENT DOCUMENTS

| | | |
|---|---|---|
| 2,981,198 A | 4/1961 | Nettel |
| 3,171,549 A | 3/1965 | Orloff |
| 3,280,991 A | 10/1966 | Melton et al. |
| 3,306,646 A | 2/1967 | Flora, Jr. |
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |
| 3,759,563 A | 9/1973 | Kitamura |
| 3,858,468 A | 1/1975 | Pasbrig |
| 4,046,262 A | 9/1977 | Vykukal et al. |
| 4,179,233 A | 12/1979 | Bromell et al. |
| 4,200,596 A | 4/1980 | Iiyama et al. |
| 4,251,791 A | 2/1981 | Yanagisawa et al. |
| 4,367,891 A | 1/1983 | Wauer et al. |
| 4,398,110 A | 8/1983 | Flinchbaugh et al. |
| 4,483,407 A | 11/1984 | Iwamoto et al. |
| 4,561,686 A | 12/1985 | Atchley |
| 4,567,417 A | 1/1986 | Francois et al. |
| 4,575,297 A | 3/1986 | Richter |
| 4,591,944 A | 5/1986 | Gravel |
| 4,598,601 A | 7/1986 | Molaug |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,230,147 A | 7/1993 | Asaoka et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,402,690 A | 4/1995 | Sekiguchi et al. |
| 5,516,249 A | 5/1996 | Brimhall |
| 5,577,417 A | 11/1996 | Fournier |
| 5,577,902 A | 11/1996 | Todo et al. |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosler |
| 6,855,170 B2 | 2/2005 | Gramnas |
| 6,920,374 B2 | 7/2005 | Takenaka et al. |
| 7,168,748 B2 | 1/2007 | Townsend et al. |
| 7,319,919 B2 | 1/2008 | Takenaka et al. |
| 7,337,040 B2 | 2/2008 | Takenaka et al. |
| 7,379,789 B2 | 5/2008 | Takenaka et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,112,179 B2 | 2/2012 | Nakajima |
| 8,132,835 B2 | 3/2012 | Ban et al. |
| 8,151,401 B2 | 4/2012 | Cheyne |
| 8,182,010 B2 | 5/2012 | Lee et al. |
| 8,204,626 B2 | 6/2012 | Yoshiike et al. |
| 8,245,728 B2 | 8/2012 | Jacobsen et al. |
| 8,295,975 B2 | 10/2012 | Arimatsu et al. |
| 8,336,420 B2 | 12/2012 | Carter et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,534,728 B1 | 9/2013 | Bosscher et al. |
| 8,560,118 B2 | 10/2013 | Greer et al. |

(56) References Cited

U.S. PATENT DOCUMENTS

| | | |
|---|---|---|
| 8,640,723 B2 | 2/2014 | Jacobsen et al. |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |
| 8,888,864 B2 | 11/2014 | Iversen et al. |
| 8,892,258 B2 | 11/2014 | Jacobsen et al. |
| 8,920,517 B2 | 12/2014 | Smith et al. |
| 8,942,846 B2 | 1/2015 | Jacobsen et al. |
| 8,977,388 B2 | 3/2015 | Jacobsen et al. |
| 8,977,398 B2 | 3/2015 | Jacobsen et al. |
| 9,205,560 B1 | 12/2015 | Edsinger et al. |
| 9,295,604 B2 | 3/2016 | Zoss et al. |
| 9,314,921 B2 | 4/2016 | Jacobsen et al. |
| 9,329,587 B2 | 5/2016 | Fudaba et al. |
| 9,333,097 B2 * | 5/2016 | Herr ................ A61F 2/604 |
| 9,526,636 B2 | 12/2016 | Bedard et al. |
| 9,533,411 B2 | 1/2017 | Jacobsen et al. |
| 9,616,580 B2 | 4/2017 | Smith et al. |
| 9,618,937 B1 | 4/2017 | Blankespoor et al. |
| 9,643,323 B2 | 5/2017 | Nagatsuka et al. |
| 9,727,076 B2 | 8/2017 | Smith et al. |
| 9,789,603 B2 | 10/2017 | Jacobsen et al. |
| 9,895,812 B2 | 2/2018 | Gonzalez et al. |
| 9,926,025 B1 | 3/2018 | Blankespoor et al. |
| 10,028,844 B2 | 7/2018 | Cheng et al. |
| 10,071,485 B2 | 9/2018 | Schiele et al. |
| 10,216,177 B2 | 2/2019 | Gildert et al. |
| 10,300,969 B1 | 5/2019 | Blackespoor et al. |
| 10,406,676 B2 | 9/2019 | Smith et al. |
| 10,512,583 B2 | 12/2019 | Smith |
| 10,533,542 B2 | 1/2020 | Smith et al. |
| 10,561,564 B2 | 2/2020 | LaChappelle et al. |
| 10,566,914 B2 | 2/2020 | Fujita et al. |
| 10,765,537 B2 | 9/2020 | Smith et al. |
| 10,828,767 B2 | 11/2020 | Smith et al. |
| 11,148,279 B1 | 10/2021 | Mooney et al. |
| 11,241,801 B2 | 2/2022 | Smith et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0056592 A1 | 3/2007 | Angold et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0009771 A1 | 1/2008 | Perry et al. |
| 2008/0023974 A1 | 1/2008 | Park et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0234996 A1 | 9/2010 | Schreiber et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0214524 A1 | 9/2011 | Jacobsen et al. |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 * | 11/2013 | Herr .................. A63B 23/0405 601/34 |
| 2013/0302129 A1 | 11/2013 | Smith et al. |
| 2013/0306430 A1 | 11/2013 | Laffranchi et al. |
| 2013/0331744 A1 | 12/2013 | Kamon |
| 2013/0333368 A1 | 12/2013 | Durfee et al. |
| 2014/0088728 A1 | 3/2014 | Herr |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 * | 6/2015 | Kazerooni ............... A61H 1/00 602/16 |
| 2015/0209214 A1 | 7/2015 | Herr et al. |
| 2015/0217457 A1 | 8/2015 | Lipson et al. |
| 2015/0272749 A1 | 10/2015 | Amend, Jr. et al. |
| 2015/0278263 A1 | 10/2015 | Bowles et al. |
| 2015/0289995 A1 | 10/2015 | Wilkinson et al. |
| 2015/0321340 A1 | 11/2015 | Smith |
| 2015/0321342 A1 | 11/2015 | Smith et al. |
| 2016/0003268 A1 | 1/2016 | Shevchenko et al. |
| 2016/0114482 A1 | 4/2016 | Lessing et al. |

(56) References Cited

U.S. PATENT DOCUMENTS

| | | | |
|---|---|---|---|
| 2016/0153508 A1* | 6/2016 | Battlogg | A61F 2/38 188/267.2 |
| 2016/0279788 A1 | 9/2016 | Kanaoka et al. | |
| 2016/0331556 A1 | 11/2016 | Wijesundara et al. | |
| 2016/0331572 A1 | 11/2016 | Popovic et al. | |
| 2016/0332302 A1 | 11/2016 | Bingham et al. | |
| 2016/0332305 A1 | 11/2016 | Gonzalez et al. | |
| 2016/0332312 A1 | 11/2016 | Song et al. | |
| 2017/0050310 A1 | 2/2017 | Kanaoka | |
| 2017/0326737 A1 | 11/2017 | Martin et al. | |
| 2018/0126548 A1 | 5/2018 | Sugito et al. | |
| 2018/0133905 A1 | 5/2018 | Smith et al. | |
| 2018/0133906 A1 | 5/2018 | Smith et al. | |
| 2018/0193172 A1 | 7/2018 | Smith et al. | |
| 2018/0193999 A1 | 7/2018 | Jacobsen et al. | |
| 2018/0194000 A1 | 7/2018 | Smith et al. | |
| 2018/0221237 A1 | 8/2018 | Swift et al. | |
| 2018/0290309 A1 | 10/2018 | Becker et al. | |
| 2018/0298976 A1* | 10/2018 | Battlogg | F16F 9/12 |
| 2019/0022853 A1 | 1/2019 | Kim et al. | |
| 2019/0105777 A1 | 4/2019 | Dalley et al. | |
| 2019/0138423 A1 | 5/2019 | Agerstam et al. | |
| 2019/0176320 A1 | 6/2019 | Smith et al. | |
| 2019/0184576 A1 | 6/2019 | Smith et al. | |
| 2020/0001450 A1 | 1/2020 | Smith et al. | |
| 2020/0164523 A1 | 5/2020 | Hallock et al. | |
| 2020/0281803 A1 | 9/2020 | Teng et al. | |
| 2020/0312109 A1 | 10/2020 | Shionozaki | |
| 2020/0346009 A1 | 11/2020 | Murray et al. | |
| 2020/0368094 A1 | 11/2020 | Yoshimi et al. | |
| 2020/0405417 A1 | 12/2020 | Shelton, IV et al. | |
| 2021/0039269 A1 | 2/2021 | Son | |
| 2021/0059780 A1 | 3/2021 | Sutherland et al. | |
| 2021/0369536 A1 | 12/2021 | Mooney et al. | |
| 2021/0378903 A1 | 12/2021 | Mooney et al. | |

FOREIGN PATENT DOCUMENTS

| | | |
|---|---|---|
| CN | 103610524 A | 3/2014 |
| CN | 203495949 U | 3/2014 |
| CN | 103802907 A | 5/2014 |
| CN | 203752160 U | 8/2014 |
| CN | 104843484 A | 8/2015 |
| CN | 105411813 A | 3/2016 |
| CN | 205250544 U | 5/2016 |
| CN | 105818143 A | 8/2016 |
| CN | 107471203 A | 12/2017 |
| CN | 108081303 A | 5/2018 |
| CN | 111267992 A | 6/2020 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2548543 B1 | 1/2015 |
| EP | 2942162 A2 | 11/2015 |
| EP | 2168548 B1 | 10/2016 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S58-45724 B2 | 10/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H03-85398 U | 8/1991 |
| JP | H04-44296 U | 4/1992 |
| JP | H05-004177 A | 1/1993 |
| JP | H05-023989 A | 2/1993 |
| JP | H06-213266 A | 8/1994 |
| JP | H06-315879 A | 11/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2003-194104 A | 7/2003 |
| JP | 2004-105261 A | 4/2004 |
| JP | 2004-195576 A | 7/2004 |
| JP | 2005-118938 A | 5/2005 |
| JP | 2005-237504 A | 9/2005 |
| JP | 2005-334999 A | 12/2005 |
| JP | 2006-007337 A | 1/2006 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2010-263761 A | 11/2010 |
| JP | 2011-156171 A | 8/2011 |
| JP | 2011-193899 A | 10/2011 |
| JP | 2011-230260 A | 11/2011 |
| JP | 2012-501739 A | 1/2012 |
| JP | 2012-125279 A | 7/2012 |
| JP | 2012-176476 A | 9/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-208293 A | 10/2013 |
| JP | 2013-220496 A | 10/2013 |
| JP | 2013-248699 A | 12/2013 |
| JP | 2014-054273 A | 3/2014 |
| JP | 2014-073222 A | 4/2014 |
| JP | 2014-200853 A | 10/2014 |
| JP | 2015-112649 A | 6/2015 |
| JP | 2015-212010 A | 11/2015 |
| JP | 2015-214019 A | 12/2015 |
| JP | 2016-539017 A | 12/2016 |
| JP | 2018-167375 | 11/2018 |
| JP | 2020-037164 A | 3/2020 |
| JP | 6748374 B2 | 9/2020 |
| KR | 2005-0037754 A | 4/2005 |
| KR | 2007-0057209 A | 6/2007 |
| KR | 2010-0112670 | 10/2010 |

(56) References Cited

FOREIGN PATENT DOCUMENTS

| | | |
|---|---|---|
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| SE | 515372 C2 | 7/2001 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2016/049622 A1 | 3/2016 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |
| WO | WO 2019/060791 A1 | 3/2019 |
| WO | WO 2020/175949 A1 | 9/2020 |

OTHER PUBLICATIONS

International Search Report for International Application No. PCT/US2021/062052 dated Apr. 7, 2022, 19 pages.
International Search Report for International Application No. PCT/US2021/062053 dated Mar. 17, 2022, 16 pages.
International Search Report for International Application No. PCT/US2021/062055 dated Mar. 30, 2022, 15 pages.
International Search Report for International Application No. PCT/US2021/062056 dated Apr. 4, 2022, 16 pages.
Extended European Search Report dated Feb. 22, 2022 in EP Application No. 21184013.7 filed May 6, 2015, 9 pages.
Invitation to Pay Additional Fees for International Application No. PCT/US2022/044922 dated Jan. 31, 2023, 23 pages.
International Search Report for International Application No. PCT/US2022/044924 dated Feb. 6, 2023, 16 pages.
Aghili et al., Sensing the torque in a robot's joints, www.memagazine.org/backissues/september98/features/torque/torque.html, 1998, pp. 1-9, The American Society of Mechanical Engineers.
Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt10090605/.
Amikabir University of Technology, Manipulator Dynamics (Power Point), Computer Engineering and Information Technology Department, to the best of applicant's knowledge article was available before the application filing date, 44 pages.
Barras, Stabilization of a Biped Robot with its arms—A Practical Approach, http://biorob.epfl.ch/files/content/sites/biorob/filed/users/170220/public/Report.pdf; May 2010, 3 3 pages, EPFL Biorobotics Laboratory (BioRob), Switzerland.
Bauman, Utah Firm Markets on Big Gorilla of an Arm, Deseret News; Jan. 27, 1993, 2 pages, Deseret News Publishing Company, Salt Lake City, Utah.
Claeyssen et al., Magnetostrictive actuators compared to piezoelectric actuators, Proceedings of SPIE—The International Society for Optical Engineering 4763, Mar. 2003, 6 pages.
Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.
Elliott et al., The Biomechanics and Energetics of Human Running using an Elastic Knee Exoskeleton, Jun. 2013, 7 pages, IEEE International Conference on Rehabilitation Robotics, Seattle, Washington.
Elliott et al., Design of a Clutch-Spring Knee Exoskeleton for Running, Journal of Medical Devices, Sep. 2014, 11 pages, vol. 8, The American Society of Mechanical Engineers, New York City, New York.
Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.
Gauthier et al., Magnetic Shape Memory Alloy and Actuator Design, Conference: 5th International Workshop on Microfactories (IWMF'06), Oct. 2006, 5 pages, Besançon, France.
Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.
Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.
Huber et al., The selection of mechanical actuators based on performance indices, Oct. 8, 1997, pp. 2185-2205, vol. 453 Issue 1965, The Royal Society, London.
Hunter et al., Fast Reversible NiTi Fibers For Use In Microrobotics, Proceedings. IEEE Micro Electro Mechanical Systems, Jan. 30-Feb. 2, 1991, pp. 166-170, Institute of Electrical and Electronics Engineers, Piscataway, New Jersey.
Industrial Magnetics, Inc., PowerLift® Magnets; www.magnetics.com/product.asp?ProductID=1; as accessed Nov. 6, 2012, 2 pages; Boyne City, Michigan.
Jacobsen et al., Design of the Utah/M.I.T. Dextrous Hand, IEEE International Conference on Robotics and Automation, 1986, pp. 1520-1532, Institute of Electrical and Electronics Engineers, Piscataway, New Jersey.
Jacobsen et al., Development of the Utah Artificial Arm, IEEE Transactions on Biomedical Engineering, Apr. 1982, pp. 249-269, vol. BME-29, No. 4, Institute of Electrical and Electronics Engineers, Piscataway, New Jersey.
Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.
Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.
Jacobsen, Science, Robotics, and Superheroes, Presented at Department of Science University of Utah Science at Breakfast, Mar. 17, 2010, 16 pages.
Jafari et al., A Novel Actuator with Adjustable Stiffness (AwAS), Oct. 18-22, 2010, 6 pages, IEEE/RSJ International Conference on Intelligent Robots and Systems, Taiwan.
Jansen et al., Exoskeleton for Soldier Enhancement Systems Feasibility Study, Sep. 2000, 44 pages, Oak Ridge National Laboratory, Oak Ridge, Tennessee.
Kazerooni, Berkeley Lower Extremity Exoskeleton (BLEEX), to the best of applicant's knowledge article was available before the application filing date, 3 pages, University of California, Berkeley, Berkeley, California.
Kim, Development of a small 6-axis force/moment sensor for robot's fingers, Measurement Science and Technology, Sep. 30, 2004, 2 pages, Issue 11, Institute of Physics and IOP Publishing Limited.
Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.
Kulick, An Unpowered Exoskeleton Springs Into Action: Researchers Increase Walking Efficiency, http://www.cmu.edu/me/news/

(56) References Cited

OTHER PUBLICATIONS archive/2015/collins-clutch.html Apr. 1, 2015, 2 pages, Carnegie Mellon University Mechanical Engineering, Pittsburgh, Pennsylvania.
Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.
Magnetic Base, www.ask.com/wiki/magnetic_base; page last updated Sep. 12, 2012, 2 pages, Retrieved from www.ask.com/wiki/magnetic_base.
Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.
Mirfakhrai et al., Polymer artificial muscles, materialstoday, Apr. 2007, pp. 30-38, vol. 10 No. 4, Elsevier, Netherlands.
Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.
Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.
Newport Corporation, Heavy-Duty Magnetic Base, 300 lb (1334 N) Holding Force, ¼20 Thread, http://search.newport.com/?q=*&x2=sku&q2=200, as accessed Apr. 23, 2011, 1 page, Irvine, CA.
Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.
Omega, Load Cell Designs, www.omega.com/literature/transactions/volume3/load3.html, Nov. 1, 2005, 3 pages.
Ostling, Wearable Robots, Technology Review, Jul./Aug. 2004, pp. 70-73, Elizabeth Bramson-Boudreau, Cambridge, Massachusetts.
Pan, Improved Design of a Three-degree of Freedom Hip Exoskeleton Based on Biomimetic Parallel Structure, Jul. 2011, 132 pages, University of Ontario Institute of Technology, Canada.
Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.
Pelrine et al., High-field deformation of elastomeric dielectrics for actuators, Materials Science and Engineering, Nov. 28, 2000, pp. 89-100, vol. 11 Issue 2, Elsevier, Netherlands.
Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.
Pin, Wearable Robotics Presented to New Horizons in Science Briefing, Oct. 2003, 34 pages, Knoxville, Tennessee.
Pratt et al., The RoboKnee: An Exoskeleton for Enhancing Strength and Endurance During Walking, International Conference on Robotics & Automation, Apr. 2004, 6 pages, IEEE, New Orleans, LA.
Robotics Research Group, Degrees of Freedom, www.robotics.utexas.edu/rrg/learn_more/low_ed/dof/, Oct. 25, 2006, 2 pages, University of Texas.
Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.
Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.
Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.
Seppala, These exoskeleton heels could help stroke victims walk again, https://www.engadget.com/2015/04/02/feet-exoskeletons/, Apr. 2, 2015, Engadget, San Francisco, California.
Shamaei et al., Estimation of Quasi-Stiffness of the Human Knee in the Stance Phase of Walking, Mar. 22, 2013, 10 pages, vol. 8 Issue 3, PLOS One, San Francisco, California.
Siddharth et al., Design and Analysis of a 1-DOF Walking Mechanism, http://siddharthswaminathan.in/files/WalkingMechanism.pdf, Nov. 2012, 7 pages, India.
Smith et al., Integrated thin-film piezoelectric traveling wave ultrasonic motors, Sensors and Actuators A: Physical, Dec. 2012, pp. 305-311, vol. 188, Elsevier, Netherlands.
Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.
Suitx, Phoenix Medical Exoskeleton, htps://www.suitx.com/phoenix-medical-exoskeleton, 3 pages, to the best of the applicant's knowledge article was available before the application filing date, US Bionics, Inc., Berkeley, California.
Suleiman, Engineering an affordable exoskeleton, Phys.org, https://phys.org/news/2014-06-exoskeleton.html, Jun. 12, 2014, 5 pages, Science X Network.
Tmsuk, Rescue Robot "T-53" release Control Technologies to Control the Synchronous Operation of the Arm, http://robot.watch.impress.co.jp/cda/news/2007/07/18/564.html, as accessed Sep. 1, 2011 5 pages, Robot Watch website.
Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.
Vanderborght et al., Variable impedance actuators: A review, Robotics and Autonomous Systems, Dec. 2013, 14 pages, vol. 61, Issue 12, Elsevier, Netherlands.
Walsh, Biomimetic Design of an Under-Actuated Leg Exoskeleton For Load-Carrying Augmentation, Massachusetts Institute of Technology, Feb. 2006, 97 pages, Massachusetts.
Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.
Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.
Yeates, Utah-built robot safeguards the workplace, http://www.ksl.com?nid=148&SID=17654421&autostart=y; Oct. 13, 2011, 3 pages, KSL Broadcasting, Salt Lake City, Utah.
Yip et al., High-Performance Robotic Muscles from Conductive Nylon Sewing Thread, 2015 IEEE International Conference on Robotics and Automation (ICRA), May 26-30, 2015, 6 pages, Seattle, Washington.
Zubrycki et al., Novel haptic glove-based interface using jamming principle, Proceedings of the 10th International Workshop on Robot Motion and Control, Jul. 6-8, 2015, 6 pages, IEEE, Poland.
David et al., Study of an External Passive Shock-absorbing Mechanism for Walking Robots, $8^{th}$ IEEE International Conference on Humanoid Robots, Dec. 1-3, 2008, pp. 435-440, Institute of Electrical and Electronics Engineers, Piscataway, New Jersey.
Kaslin et al., Towards a Passive Adaptive Planar Foot with Ground Orientation and Contact Force Sensing for Legged Robots, IEEE International Conference on Intelligent Robots and Systems, Oct. 1-5, 2018, pp. 2707-2714, Institute of Electrical and Electronics Engineers, Piscataway, New Jersey.
Liu et al., Cat-inspired Mechanical Design of Self-Adaptive Toes for a Legged Robot, IEEE International Conference on Intelligent Robots and Systems, Oct. 9-14, 2016, pp. 2425-2430, Institute of Electrical and Electronics Engineers, Piscataway, New Jersey.

(56) References Cited

OTHER PUBLICATIONS

Liu et al., Concept and Design of a Lightweight Biped Robot for Walking on Rough Terrain, IEEE International Conference on Robotics and Biomimetics, 2017, 6 pages, Institute of Electrical and Electronics Engineers, Piscataway, New Jersey.

* cited by examiner

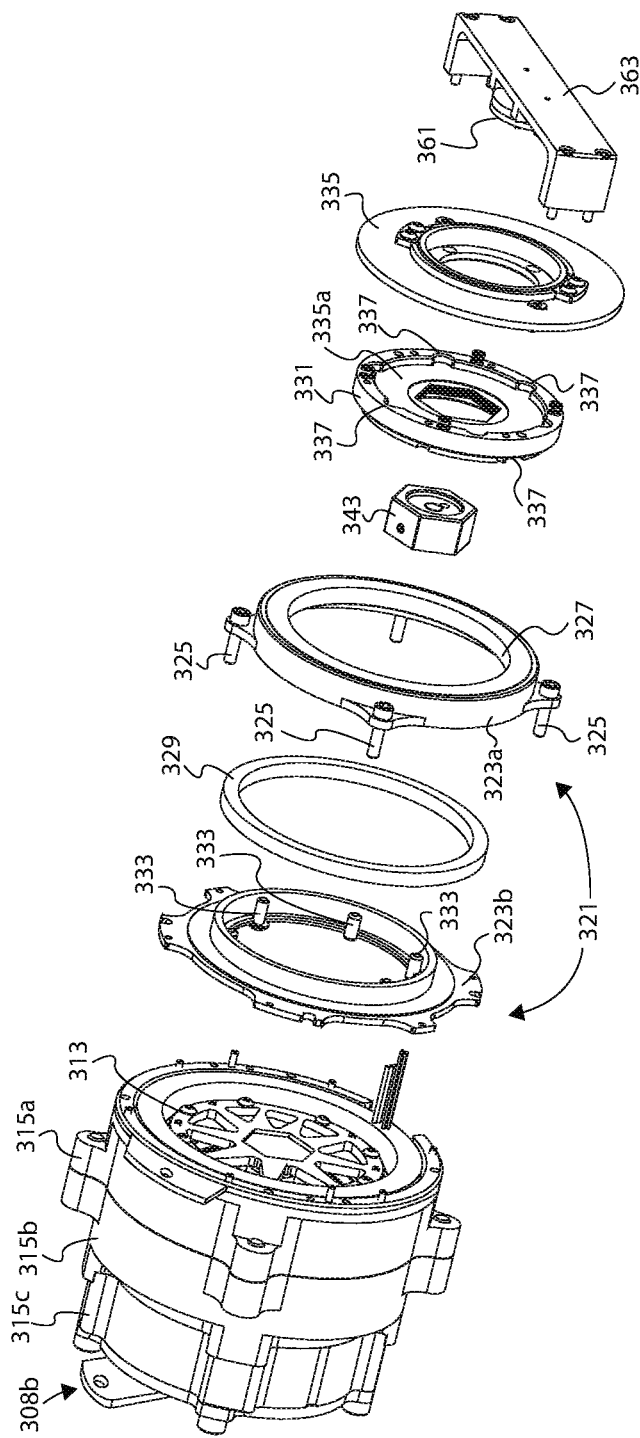

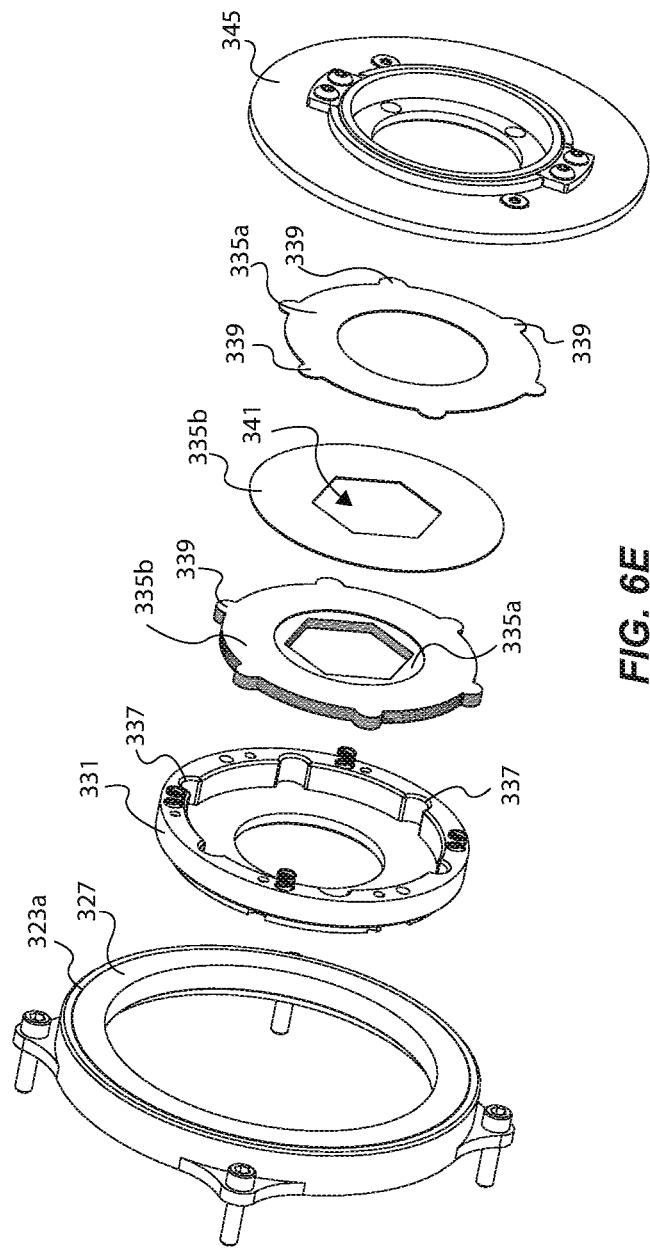

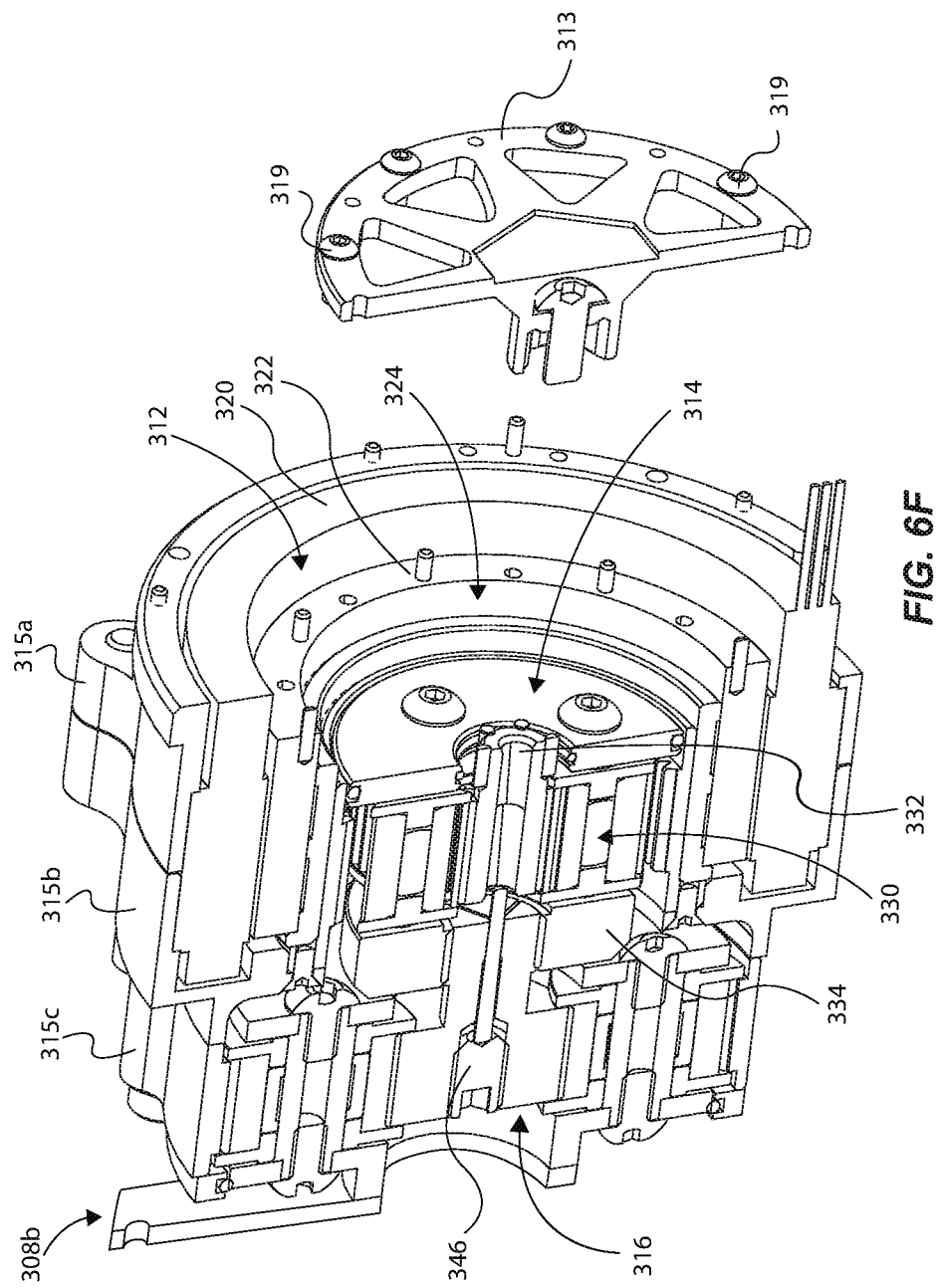

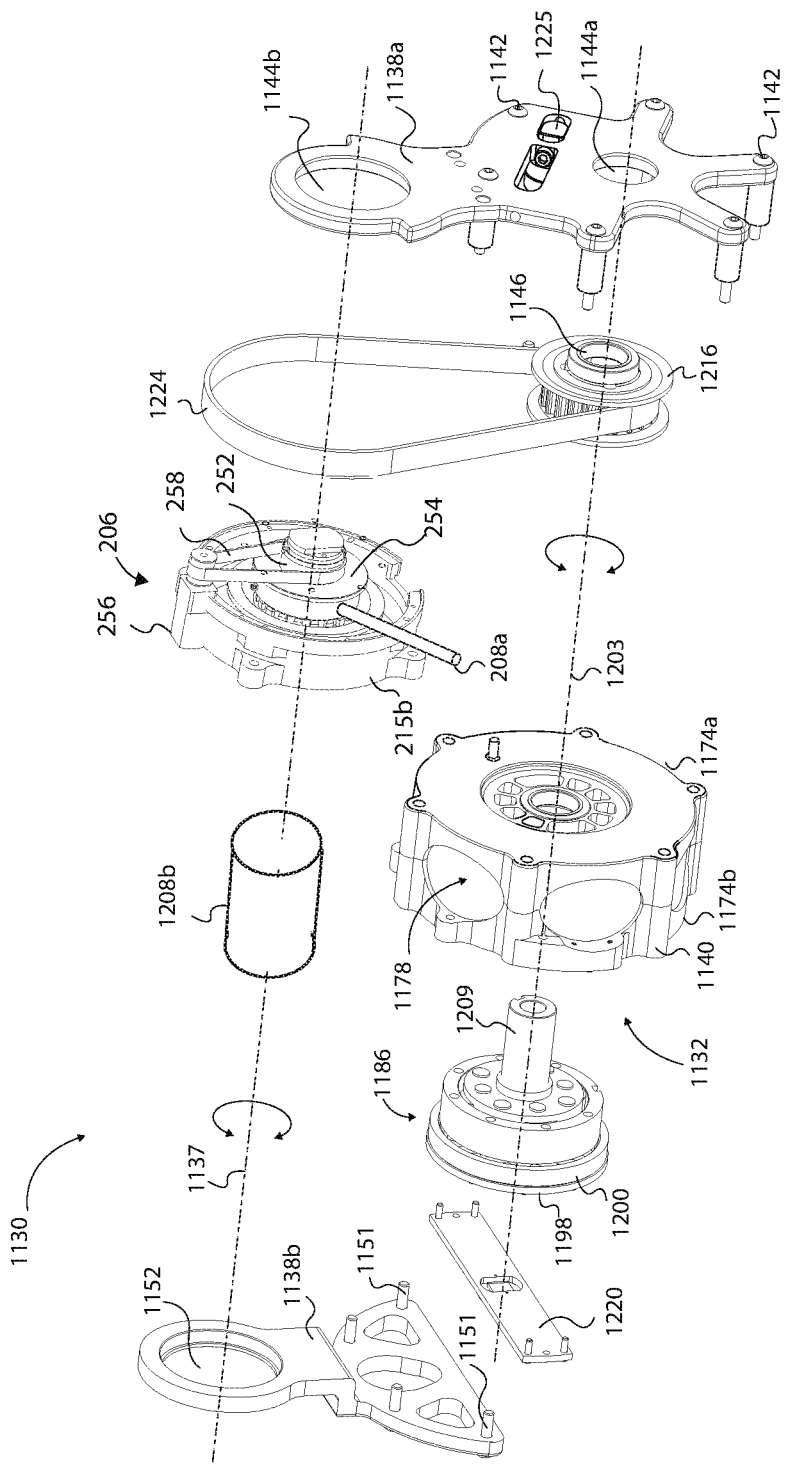

CLUTCHED JOINT MODULES HAVING A QUASI-PASSIVE ELASTIC ACTUATOR FOR A ROBOTIC ASSEMBLY

RELATED APPLICATIONS

This is a divisional application of U.S. application Ser. No. 15/810,102, filed Nov. 12, 2017, entitled "Clutched Joint Modules Having a Quasi-Passive Elastic Actuator for a Robotic Assembly" which claims the benefit of U.S. Provisional Application Ser. No. 62/421,175, filed Nov. 11, 2016, which is incorporated by reference herein in its entirety.

BACKGROUND

A wide variety of exoskeleton, humanoid, robotic arms, and other robots and robotic systems exist, many of which seek the most efficient operation possible. One fundamental technical problem that continues to be a focus is how such systems, such as where energetic autonomy is concerned, can minimize power consumption while still providing acceptable levels of force output. Indeed, power remains an inevitable challenge in the world of robotics. Designers of such systems typically attempt to optimize operation based on the intended use or application. In many cases, either power or efficiency is sacrificed, at least to some extent. For instance, some robotic systems employ high-output power systems that can meet the force output demands of the robotic system, putting this ahead of any efficiency considerations. On the other hand, some robotic systems employ more efficient power systems in an attempt to improve efficiency, with force output being a secondary consideration. High output force or power systems, while capable of performing various tasks, can be costly. Moreover, such systems often are tethered to a power source as portable power remains limited in its capabilities. Efficient, yet low force output systems can lack practicality, inasmuch as many robotic systems are designed to assist humans in work related or other tasks that require a certain level of force in order to perform the task(s). Overall, the power issue has been a challenging obstacle with various efforts being made to maximize output while minimizing power consumption. Even small advances in this ratio of power to output energy consumption area can be highly beneficial. While much research and development is ongoing to improve power sources, another way robotic systems can improve the power to energy output ratio is through the structural build of the robotic system, namely the way various components are configured, how these are controlled, and if the systems can take advantage of naturally occurring phenomenon, such as gravity.

BRIEF SUMMARY OF THE INVENTION

An initial summary of the disclosed technology is provided here, Specific technology examples are described in further detail below. This initial summary is intended to set forth examples and aid readers in understanding the technology more quickly, but is not intended to identify key features or essential features of the technology nor is it intended to limit the scope of the claimed subject matter.

The present disclosure sets forth a clutched joint module of a robotic assembly, comprising an output member operable to couple to a first support member of a robotic system; an input member operable to couple to a second support member of the robotic system; a primary actuator operable to apply a primary torque to the output member to rotate the first and second support members relative to one another about an axis of rotation of the clutched joint module; a quasi-passive elastic actuator coupled to the input member and operable to apply an augmented torque to the output member that combines with the primary torque applied by the primary actuator to rotate the output member about the axis of rotation; and a clutch mechanism operably coupled to the primary actuator and the quasi-passive elastic actuator, the clutch mechanism operable in an engaged state and a disengaged state, wherein, in the engaged state, the clutch mechanism operates to place the quasi-passive elastic actuator in an elastic state, and to facilitate application of the augmented torque.

In the disengaged state, the clutch mechanism can operate to place the quasi-passive elastic actuator in an inelastic state.

The quasi-passive elastic actuator can comprise an elastic component in the form of a mechanical elastic component. The mechanical elastic component can comprise a torsional coil spring.

The primary actuator can comprise a primary axis of rotation substantially collinear with the axis of rotation of the clutched joint module.

The clutch mechanism can comprise a clutch axis of rotation substantially collinear with the axis of rotation of the clutched joint module.

The clutched joint module can further comprise a transmission operable about the axis of rotation of the clutched joint module, wherein the transmission is operably coupled between the primary actuator and the output member.

The clutch mechanism, the primary actuator, and the transmission can all arranged and operable about the axis of rotation of the clutched joint module.

The transmission can be at least partially disposed within a central void of the primary actuator.

At least one of the clutch mechanism or quasi-passive elastic actuator, in the elastic state, can operate as a brake to restrict rotation between the input and output members.

The clutch mechanism can comprise a rotary transfer component coupled to the primary actuator; an engagement ring coupled to the torsional coil spring; a movable engagement component coupled to the input member and engaged with the engagement ring; and a clutch actuator coupled to the movable engagement component and operable to translate the movable engagement component to engage the rotary transfer component with the engagement ring to cause the clutch mechanism to function in the engaged state to facilitate application of the augmented torque.

The engagement ring can surround the torsional coil spring, wherein engagement features of the movable engagement component can engage with engagement features of the engagement ring.

Upon a first rotation of the input member with the clutch mechanism in the engaged state, the torsional coil spring can be operable to store energy, and upon a second rotation of the input member with the clutch mechanism maintained in the engaged state, the torsional spring can be operable to release energy to apply the augmented torque, and wherein upon a third rotation of the input member, the clutch actuator is operable to disengage the movable engagement component from the rotary transfer component to disengage the clutch mechanism, and to place the quasi-passive elastic actuator in the inelastic state to facilitate removal of the augmented torque. The first, second and third rotations can be in the same direction, or different directions.

The clutch mechanism can further comprise a splined shaft rotatably coupled to the rotary transfer component and coupled to the torsional coil spring; and a splined collar coupled to the splined shaft, wherein the clutch actuator is coupled to the splined collar by a transmission belt operable to rotate the splined collar, thereby causing translation of the movable engagement component between an engaged state and disengaged state with respect to the rotary transfer component.

The primary actuator can comprise an electric motor having a central void, wherein the clutched joint module can further comprise a first transmission at least partially disposed within the central void; and a second transmission operatively coupled between the first transmission and the output member.

The electric motor, the rotary transfer component, the engagement ring, the movable engagement component, and the first and second transmissions can each rotate about the axis of rotation of the clutched joint module.

The rotary transfer component can be coupled to a rotor of the electric motor and to the first transmission, such that the rotary transfer component transfers the primary torque from the electric motor to the first transmission.

The clutch mechanism can further comprise a semi-engaged state, the clutch mechanism comprising a clutch housing coupled to the input member; a plurality of input plates retained by the clutch housing; a plurality of output plates rotatably supported by the clutch housing and rotatably interfaced with the plurality of input plates in an alternating manner; and an electromagnetic actuator coupled to the clutch housing and operable to apply selective, variable compression to the output plates and the input plates to cause the clutch mechanism to function in the engaged or semi-engaged state where at least one of a braking force is generated or the augmented torque is applied to the output member.

The clutch mechanism can further comprise a clutch output shaft coupled to the output plates and freely movable relative to the input plates, such that, when the clutch mechanism is in the disengaged state, the output plates freely rotate relative to the input plates.

The quasi-passive elastic actuator can comprise an elastic component in the form of a torsional coil spring, wherein one end of the torsional coil spring is coupled to a transfer shaft coupled to the clutch output shaft and coupled to the primary actuator, and wherein the other end of the torsional coil spring is coupled to the input member.

The primary actuator can comprise an electric motor, and the clutched joint module can further comprise a transmission operatively coupled to the electric motor and the transfer shaft.

The electric motor, the transfer shaft, the clutch output shaft, and the transmission can each rotate about the axis of rotation of the clutched joint module.

The present disclosure sets forth a robotic system for minimizing power consumption of the robotic system, comprising a plurality of support members; and a plurality of clutched joint modules, each rotatably coupling together at least two of the plurality of support members, each clutched joint module comprising a joint rotatable about an axis of rotation and defining a degree of freedom of the robotic system; a primary actuator operable to apply a primary torque to rotate the joint; a quasi-passive elastic actuator operable to apply an augmented torque that combines with the primary torque from the primary actuator to rotate the joint; and a clutch mechanism coupled to the primary actuator and the quasi-passive elastic actuator, the clutch mechanism operable in an engaged state and a disengaged state, wherein, in the engaged state, the clutch mechanism operates to place the quasi-passive elastic actuator in an elastic state, and to facilitate application of the augmented torque.

With regards to the system, the clutch mechanism can comprise a clutch axis of rotation substantially collinear with the axis of rotation of the joint.

The system can further comprise a transmission operable about the axis of rotation of the joint, wherein the transmission is at least partially disposed within a central void of the primary actuator.

A first clutched joint module of the plurality of the plurality of quasi-passive joint modules can comprise a quasi-passive elastic actuator having a type of an elastic component different from a type of an elastic component of a quasi-passive elastic actuator of a second clutched joint module of the plurality of clutched joint modules.

The clutch mechanism can further comprise a semi-engaged state, and the electromagnetic actuator can be operable to apply selective, variable compression to the output plates and the input plates to cause the clutch mechanism to function in the engaged or semi-engaged state where at least one of a braking force is generated or the augmented torque is applied to the output member.

The present disclosure further sets forth a method for operating a robotic joint of a robotic system, the method comprising selectively operating a clutch mechanism of a clutched joint module in an engaged state to cause a quasi-passive elastic actuator to enter an elastic state, the clutched joint module operating about and defining a joint of the robotic system; effecting a first rotation of the joint to cause the quasi-passive elastic actuator to store energy during at least a portion of the rotation of the joint; effecting a second rotation of the joint and causing the stored energy from the quasi-passive elastic actuator to be released in the form of an augmented torque applied to an output member of the clutched joint module; selectively operating the clutch mechanism in a disengaged state to cause the quasi-passive elastic actuator to enter an inelastic state; and effecting a third rotation of the joint, wherein the quasi-passive elastic actuator facilitates a free swing mode of the clutched joint module and the joint. The first, second and third rotations can be in the same direction, or different directions.

The method can further comprise selectively operating the clutch mechanism in the engaged and disengaged states to switch the quasi-passive elastic actuator between elastic and inelastic states, respectively.

Effecting at least one of the first, second or third rotation of the joint can comprise operating a primary actuator to apply a primary torque to the output member.

Effecting at least one of the first, second or third rotation of the joint can comprise receiving a force applied about the joint from an external source sufficient to induce the rotation.

The method can further comprise transferring the primary torque from the primary actuator to a transmission to actuate the clutched joint module.

The quasi-passive actuator can comprise an elastic component in the form of a torsional coil spring.

The method can further comprise operating a clutch actuator of the clutch mechanism to cause a movable engagement component to engage one or more engagement features of an engagement ring coupled to the torsional coil spring, thereby causing the clutch mechanism to enter the engaged state to activate the quasi-passive elastic actuator.

The clutch mechanism can further comprise a semi-engaged state, the method can further comprise selectively operating an electromagnetic actuator to generate a variable electromagnetic field to apply a variable compression force to a plurality of plates in the clutch mechanism, thereby causing the clutch mechanism to enter one of the engaged or semi-engaged states where at least one of a braking force is generated or the augmented torque is applied to the output member.

The present disclosure further sets forth a clutched joint module for use within a robotic assembly, comprising an output member operable to couple to a first support member of a robotic system; an input member operable to couple to a second support member of the robotic system; a primary actuator operable to apply a primary torque to the output member to rotate the first and second support members relative to one another about an axis of rotation of the clutched joint module, wherein the primary actuator and the output member are operatively coupled to each other by a torque transfer device; a quasi-passive elastic actuator coupled to the input member and operable to apply an augmented torque to the output member that combines with the primary torque applied by the primary actuator to rotate the output member about the axis of rotation; and a clutch mechanism operably coupled to the primary actuator and the quasi-passive elastic actuator, the clutch mechanism operable in an engaged state and a disengaged state, wherein, in the engaged state, the clutch mechanism operates to place the quasi-passive elastic actuator in an elastic state, and to facilitate application of the augmented torque.

The clutch mechanism and the primary actuator can each have a central axis of rotation substantially parallel to each other.

The quasi-passive elastic actuator can comprise a torsional coil spring.

The clutch mechanism can comprise a rotary transfer component coupled to the primary actuator; an engagement ring coupled to the torsional coil spring; a movable engagement component coupled to the input member and engaged with the engagement ring; and a clutch actuator coupled to the movable engagement component and operable to translate the movable engagement component to engage the rotary transfer component with the engagement ring to cause the clutch mechanism to function in the engaged state to facilitate application of the augmented torque.

The engagement ring can surround the torsional coil spring; and engagement features of the movable engagement component can engage with engagement features of the engagement ring.

Upon a first rotation of the input member with the clutch mechanism in the engaged state, the torsional coil spring can be operable to store energy, and upon a second rotation of the input member with the clutch mechanism maintained in the engaged state, the torsional spring can be operable to release energy to apply the augmented torque, and wherein upon a third rotation of the input member, the clutch actuator can be operable to disengage the movable engagement component from the rotary transfer component to disengage the clutch mechanism, and to place the quasi-passive elastic actuator in the inelastic state to facilitate removal of the augmented torque. The first, second and third rotations can be in the same direction, or different directions.

The clutch mechanism can comprise a clutch housing coupled to the input member; a plurality of input plates retained by the clutch housing; a plurality of output plates rotatably supported by the clutch housing and rotatably interfaced with the plurality of input plates in an alternating manner; and an electromagnetic actuator coupled to the clutch housing and operable to apply a compression force to the output plates and the input plates to cause the clutched mechanism to function in the engaged state to facilitate application of the augmented torque.

BRIEF DESCRIPTION OF THE DRAWINGS

Features and advantages of the invention will be apparent from the detailed description which follows, taken in conjunction with the accompanying drawings; which together illustrate, by way of example, features of the invention; and, wherein:

FIG. 6D is an exploded view of the clutched joint module of FIG. 6A;

FIG. 6E is an exploded view of a portion of the clutched joint module of FIG. 6A;

FIG. 6F is a cross sectional exploded view of a portion of the clutched joint module of FIG. 6A;

FIG. 7A is an exploded view of a clutched joint module, having the clutch mechanism and quasi-passive elastic actuator of FIG. 5A-5E.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial summary of technology embodiments is provided above and then specific technology embodiments are described in further detail later. This initial summary is intended to aid readers in understanding the technology more quickly but is not intended to identify key features or essential features of the technology nor is it intended to limit the scope of the claimed subject matter.

Figure 1:
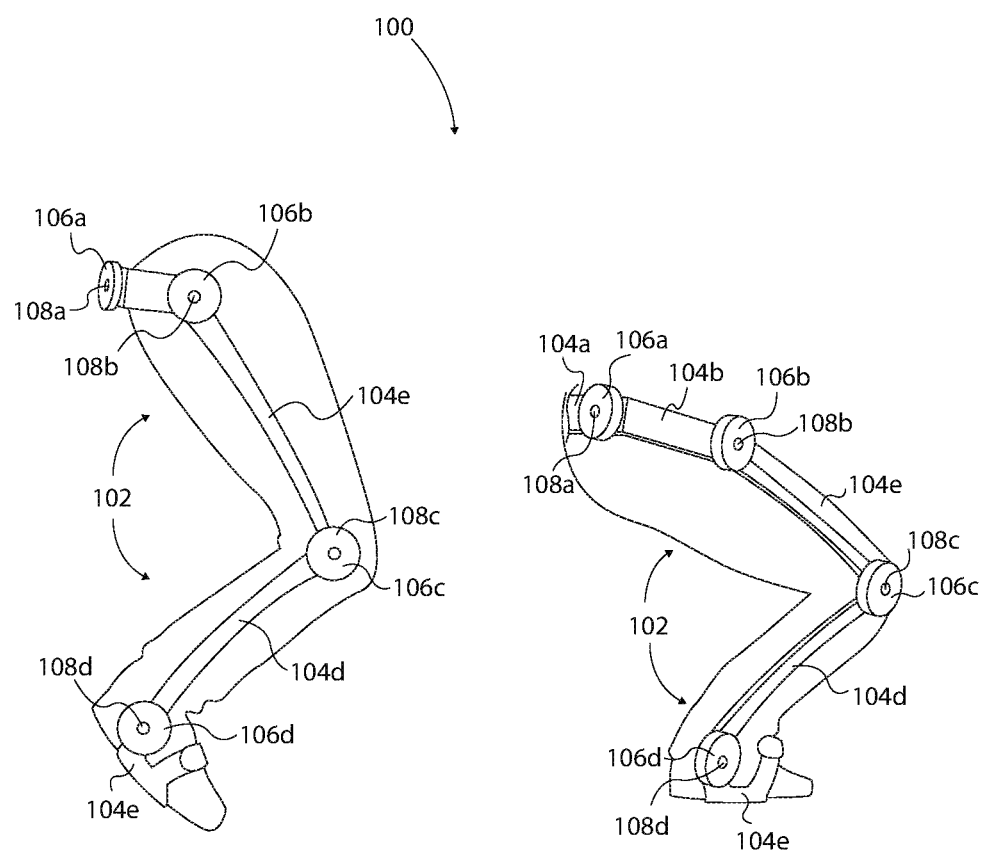
FIG. 1 illustrates two positions of a robotic assembly in the form of a lower exoskeleton having at least one clutched joint module in accordance with an example of the present disclosure.

One example of a robotic assembly 100 is generically illustrated in FIG. 1. The robotic assembly 100 is shown in the form of an exoskeleton, and particularly a lower exoskeleton wearable by a user about the lower body. However, this is not intended to be limiting in any way as the concepts discussed herein can be applicable to and incorporated into or implemented with various types of robotic devices, such as exoskeletons (both upper and lower exoskeletons), humanoid robots or robotic devices, teleoperated robots or robotic devices, robotic arms, unmanned ground robots or robotic devices, master/slave robots or robotic devices (including those operable with or within a virtual environment), and any other types as will be apparent to those skilled in the art.

Figure 4A:
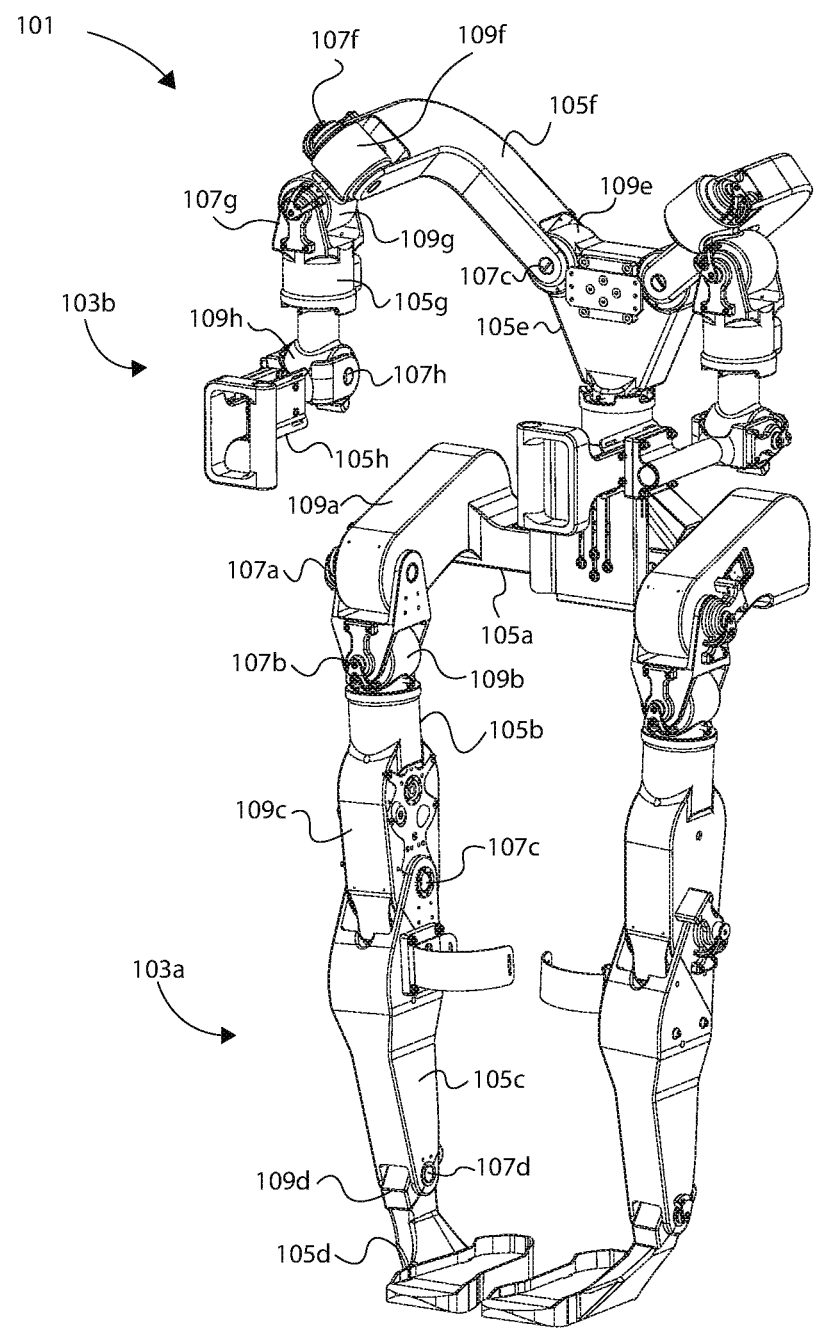
FIG. 4A is an isometric view of a robotic assembly, namely a wearable robotic exoskeleton, having at least one clutched joint module in accordance with an example of the present disclosure.

In the example of the robotic assembly 100, the exoskeleton as disclosed herein can be configured as a full-body exoskeleton (i.e., similar to the exoskeleton having both a lower body portion and upper body portion, see FIG. 4A), or as only a lower body exoskeleton (i.e., some or all of the lower body portion), or as only an upper body exoskeleton (i.e., some or all of the upper body portion).

In some examples, the robotic assembly 100 can comprise left and right exoskeleton limbs. Note that only the right exoskeleton limb 102 is shown in FIG. 1, but it should be appreciated that the principles discussed can relate to joint modules of any exoskeleton limb of an upper body or lower body exoskeleton. The right exoskeleton limb 102 can comprise a plurality of lower body support members 104a-d. The support members 104a-d can be coupled together for relative movement about a plurality of clutched joint modules 106a-d defining a plurality of degrees of freedom about respective axes of rotation 108a-d. The rotational degrees of freedom about the axes of rotation 108a-d can correspond to one or more degrees of freedom of the human leg. For example, the rotational degrees of freedom about the axes 108a-d can correspond, respectively, to hip abduction/adduction, hip flexion/extension, knee flexion/extension, and ankle flexion/extension, respectively. Similarly, although not shown, rotational degrees of freedom about respective axes of rotation within an upper body exoskeleton can correspond to one or more degrees of freedom of a human arm. For example, the degrees of freedom about the axes of rotation can correspond to shoulder abduction/adduction, shoulder flexion/extension, shoulder medial/lateral rotation, elbow flexion/extension, wrist pronation/supination, and wrist flexion/extension. A degree of freedom corresponding to wrist abduction/adduction can also be included, as desired.

A human user or operator may use or interact with the exoskeleton robotic assembly 100 (or 101 of FIG. 4A) interfacing with the robotic assembly 100. This can be accomplished in a variety of ways as is known in the art. For example, an operator may interface with the robotic assembly 100 by placing his or her foot into a foot portion of the assembly, where the foot of the operator can be in contact with a corresponding force sensor. Portions of the human operator can also be in contact with force sensors of the exoskeleton robotic assembly 100 located at various locations of the robotic assembly 100. For example, a hip portion of the robotic assembly 100 can have one or more force sensors configured to interact with the operator's hip. The operator can be coupled to the robotic assembly 100 by a waist strap, shoulder strap or other appropriate coupling device. The operator can be further coupled to the robotic assembly 100 by a foot strap and/or a handle for the operator to grasp. In one aspect, a force sensor can be located about a hip, knee or ankle portion of the robotic assembly 100, corresponding to respective parts of the operator. While reference is made to sensors disposed at specific locations on or about the robotic assembly 100, it should be understood that position or force sensors, or both, can be strategically placed at numerous locations on or about the robotic assembly 100 in order to facilitate proper operation of the robotic assembly 100.

As a general overview, clutched joint modules 106a-d can be associated with various degrees of freedom of the exoskeleton to provide forces or torques to the support members in the respective degrees of freedom. Unlike traditional exoskeleton systems and devices, the robotic assembly 100 can be configured, such that each clutched joint module is configured as either an active actuator, or a quasi-passive actuator, as further discussed below. As a quasi-passive actuator, a particular clutched joint module (106a-d) can be configured to recover energy, which can reduce complexity and power consumption of the robotic assembly 100. For example, the clutched joint module 106c, which defines a degree of freedom corresponding to a degree of freedom of knee flexion/extension, can be configured to recover energy during a first gait movement and then release such energy during a second gait movement to apply an augmented torque to assist a primary actuator providing a primary torque in rotation of the joint about the degree of freedom (and in parallel or series with the torque applied by the primary actuator of the clutched joint module 106c, as discussed below) The clutched joint module 106c can be selectively controlled, so as to be engaged (i.e., caused to enter an operating state or condition in which the elastic actuator stores and releases energy (an elastic state)) and disengaged from operation (i.e., caused to enter an operating state or condition or configuration where it neither stores nor releases energy (an inelastic state)), such that the joint "freely swings" with negligible resistance to rotate the joint as the operator walks or runs, for instance. By operating in parallel or series with the primary actuator (e.g., a primary motor operable to actuate the joint), the quasi-passive elastic actuator can provide or apply an augmented torque in parallel or series with the torque provided by the primary actuator (i.e., a torque that is added to the torque generated by the primary actuator). The quasi-passive elastic actuator can comprise a compact internal valve, such as a two-way valve, that can be controlled and operated to change the modes of the quasi-passive actuator, namely to switch between an elastic state (where the actuator acts as a spring for transient energy storage and recovery), and an inelastic state (where the actuator employs a shunting function that allows the actuator to move freely (i.e., not to store or release energy) (except for friction and movement of fluid through the valve). And, the clutched joint module 106c (as a quasi-passive actuator) can be "tuned" to comprise a desired stiffness, which can also be modified, as further discussed below Thus, the magnitude of stiffness for a given joint is adjustable for mission specific payloads and terrain-specific gaits while the active valve controls exactly when that stiffness is engaged for energy recovery during the support phase and when it is disengaged during the free swinging phase.

As a quasi-passive actuator, the result is effectively a quasi-passive elastic mechanism that is selectively operable to recover energy (e.g., energy lost during some gait or other motions) to reduce or minimize power consumption required to actuate the joint.

The example elastic actuators described herein can be referred to as quasi-passive elastic actuators as they are operable in active and inactive states or modes of operation (as compared to being entirely passive elastic actuators that are always either storing energy or releasing energy during all rotational movements of a joint, or other movements of a mechanical system). In examples described herein, the passive and inactive modes or states of operation can be selectable or controllable and even dynamically selectable or controllable (e.g., selectable in real-time), as well as repeatedly switched from one state or mode to another state or mode, during operation of the robotic system. Depending upon the configuration of the clutched joint module, example quasi-passive elastic actuators can comprise a first active state (sometimes referred to herein as an "elastic state") in which the quasi-passive elastic actuator can be actuated to store and release energy during various rotations of a joint of the robotic system, a second passive state (sometimes referred to herein as an "inelastic state") in which the quasi-passive elastic actuator can be made inactive, such that energy is neither stored nor released during various rotations of the joint, and in some cases a third semi-active or partially active state (sometimes referred to herein as a "semi-elastic state") in which the quasi-passive elastic actuator can be partially actuated to store and release energy during various rotations of the joint. In some example robotic systems, the quasi-passive elastic actuator can be switchable between the different modes or states of operation as needed or desired depending on, for example, needed or desired tasks and corresponding rotation movements, various torque or load requirements of the one or more joints of the robotic system, or needed or desired braking forces.

When combining a plurality of clutched joint modules within a robotic assembly, such as the lower body exoskeleton shown in FIG. 1 or 4A, for example, a significant amount of energy can be recovered and utilized during movement (via hip, knee, and ankle joints), which can reduce weight, size, complexity, and power consumption of the exoskeleton. Moreover, each of the various joint modules in the robotic system or assembly can comprise the same type or a different type of quasi-passive elastic actuators (or in other words the same type of different types of elastic components), thus the robotic assembly can be configured for optimal performance depending upon the particular application or tasks to be carried out. The above general overview is explained in more detail below. As active actuators (i.e., having no quasi-passive elastic element), a particular clutched joint module can be selectively operable (i.e., via a clutch mechanism) to be engaged as an active actuator to actuate a joint, and also to provide gravity compensation, as further discussed below.

Figure 2A:
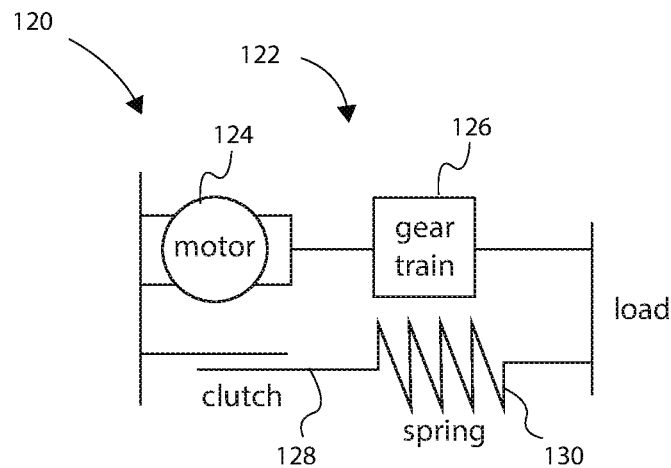
FIG. 2A is a schematic illustration of a clutched joint module in accordance with an example of the present disclosure.
Figure 2B:
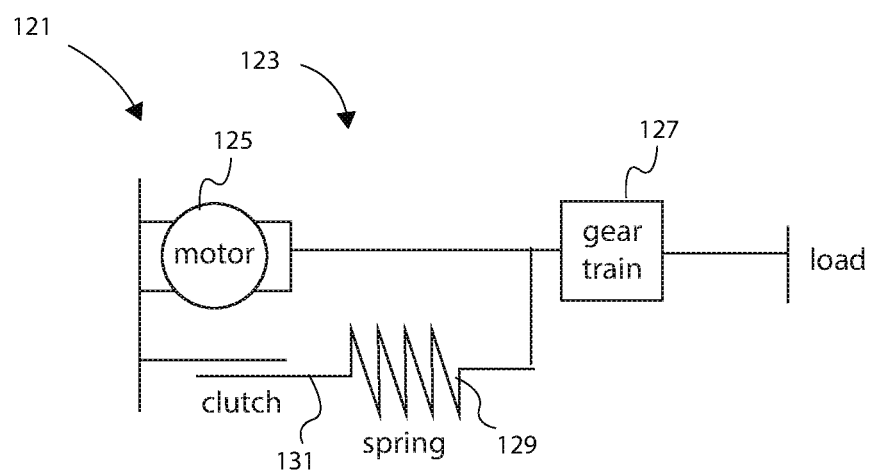
FIG. 2B is a schematic illustration of a clutched joint module in accordance with an example of the present disclosure.

FIGS. 2A and 2B each schematically illustrate clutched joint modules in accordance with two examples of the present disclosure. FIG. 2A shows a clutched joint module 120 having a primary actuator 122 operable to provide a primary torque to the clutched joint module. In this example, the primary actuator can comprise a motor 124 and a transmission or gear train 126 (e.g., a planetary transmission) operating in parallel with a clutch mechanism 128 and an elastic element or spring 128 (e.g., a quasi-passive elastic actuator, such as a rotary or linear pneumatic (air or other gas) type of quasi-passive elastic actuator). The primary actuator 122 is operable to apply a primary torque to a load (e.g., to rotate an output member coupled to a robotic support member) in parallel with an augmented torque selectively applied by the spring (quasi-passive elastic actuator) 128 to rotate a joint of a robotic assembly, as in FIGS. 1 and 4A. The augmented torque is selectively applied by operation of the clutch mechanism 128, which is operable between an engaged state and a disengaged state, as further described below. Note that the gear train 126 can be removed or may not be needed, or a supplemental transmission or gear train can be coupled adjacent the gear train 126 to provide a two-stage transmission from the motor 124 to the load. The examples of FIGS. 5A-5E are schematically represented by FIG. 2A.

FIG. 2B shows a clutched joint module 121 comprising a primary actuator 123 comprising a motor 125 and a transmission or gear train 127 (e.g., a planetary transmission) operating in parallel with a spring 129 and clutch mechanism 131, The clutch mechanism 131 is operable between an engaged state (that facilitates actuation of a primary torque by the primary actuator 123 to the load) and a disengaged state to selectively control application of the spring 129. The spring 129 is operable to store energy and then release energy to apply an augmented torque, in parallel with a primary torque applied by the primary actuator 123, to apply a combined torque to the load (e.g., to rotate an output member coupled to a robotic support member). Here, the output of the spring 129 is coupled between the motor 125 and the gear train 127 (whether coupled to the output of the motor 125 or the input of the gear train 127), such as disclosed below regarding the example of FIG. 6A.

Figure 3A:
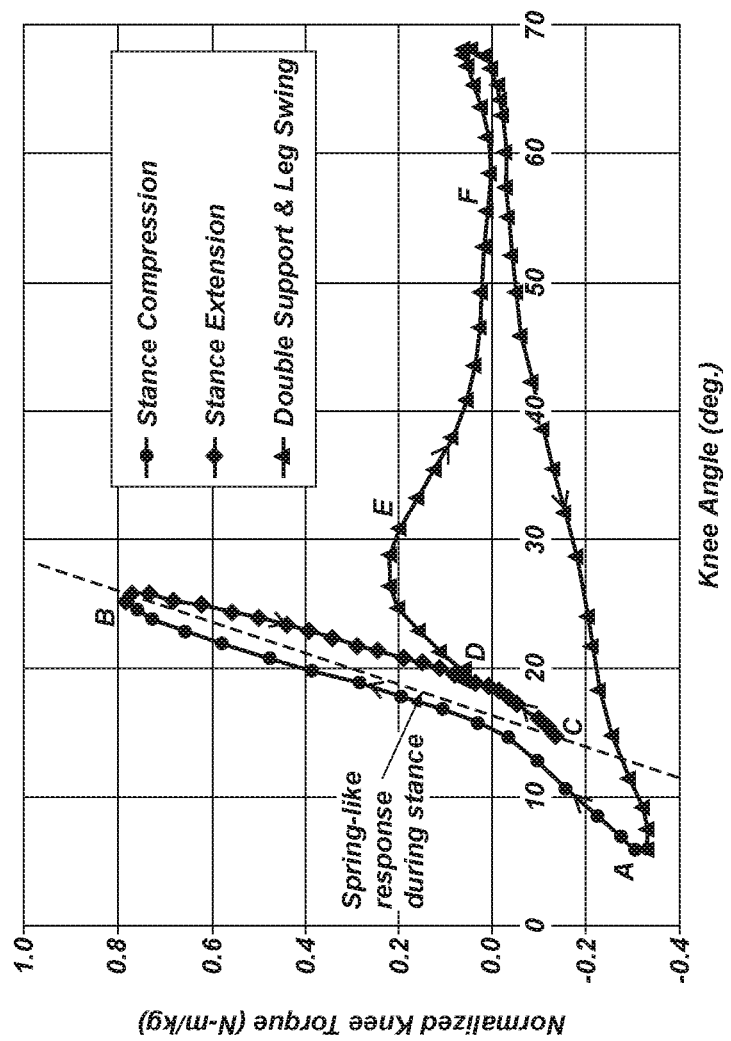
FIG. 3A is a graph illustrating human weight normalized knee joint torque vs, knee joint angle of a human gait cycle.

FIG. 3A is a graph showing joint torque vs. joint position as these occur during an example gait of a human, the graph showing the torque (N-m/kg) occurring in the joint relative to or as corresponding to the angle of rotation of the joint. This particular graph is illustrative of an example torque/angular rotation relationship of a human knee (without wearing an exoskeleton), while walking approximately 3 mph on a flat surface. A first gait movement from point A to point B illustrates stance compression following heel strike, a second gait movement from point B to C illustrates stance extension, with the stance phase being completed at point D. A third gait movement between points D, E, F, and A illustrates "double support and leg swing." Therefore, the "stance phase" is from heel strike (point A) to toe-roll/terminal stance (points A to D), where the torque-joint profile has a quasi-elastic behavior (walking and running are similar regarding this quasi-elastic stiffness). During this phase, the knee also acts as a shock absorber. The "swing phase" is from toe-off to heel strike (points E to A), and during this phase the knee exhibits a quasi-ballistic (passive dynamics) response with some damping during the final extension that occurs before heel strike (thus, the knee acts as a controlled damper or shock absorber).

This characteristic of the human gait is not unique to the knee joint, nor limited to the walking gait, and forms the basis for the clutched joint modules discussed herein. Indeed, when reviewing the joint torque vs. position plots of simulated cyclical exoskeleton activities, such as walking, running, and step climbing, there are periods of time during these specific gait motions where elastic energy recovery can be exploited to reduce the requirement for motor torque to run the joint. Thus, the clutched joint modules described herein can be configured to exploit the features of the natural motion of the hip, knee, and ankle, for instance, to minimize demands on powered actuators (e.g., electric-geared motors) to reduce overall power consumption within the robotics assembly. The clutched joint modules discussed herein can also be incorporated into shoulder and elbow joints, for instance, but these may be more task-specific than as with the lower body joints, as further discussed below. However, the clutched joint modules of lower joints (e.g., hip, knee, ankle) can also be configured to operate based on a specific task (e.g., lifting a load, sitting and standing, and others), rather than just a cyclical operation (e.g., walking or running).

Figure 3B:
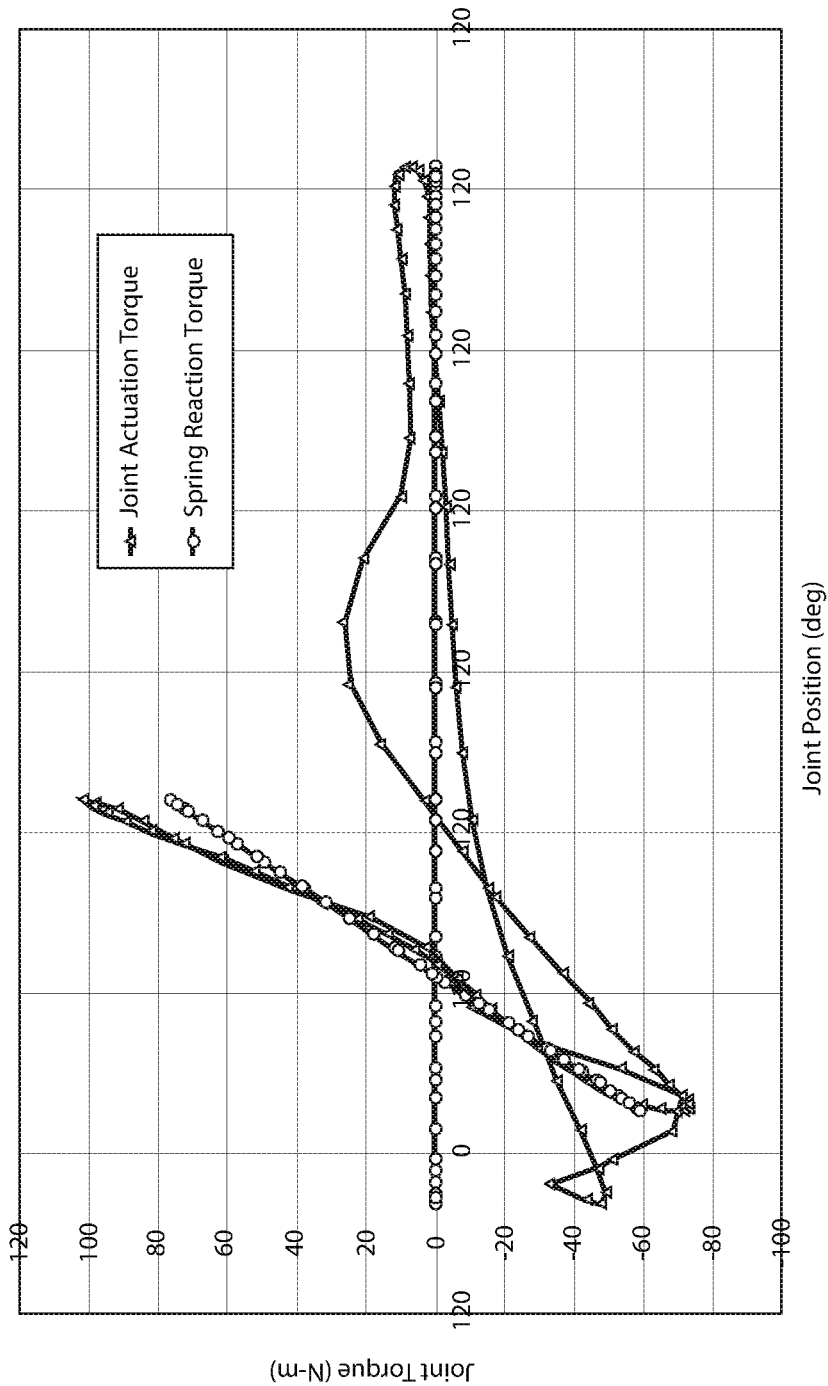
FIG. 3B is a graph illustrating the torque required to accomplish a joint trajectory and a portion of a gait where an elastic response can be created by a clutched joint module.

FIG. 3B is a graph showing a standard exoskeleton knee joint torque (N-m) vs. position (deg.) for walking at 3.5 mph with a 50 lb. payload. The plotted "triangular" labeled line ("joint actuation torque") represents the required overall torque to accomplish the prescribed joint trajectory, while the plotted "circular" labeled lines ("spring reaction torque") represents the part of the gait where an elastic response can by created by a quasi-passive elastic actuator of a clutched joint module. Thus, this spring reaction torque can be exploited to reduce power consumption to actuate a joint, as further detailed below.

Figure 3C:
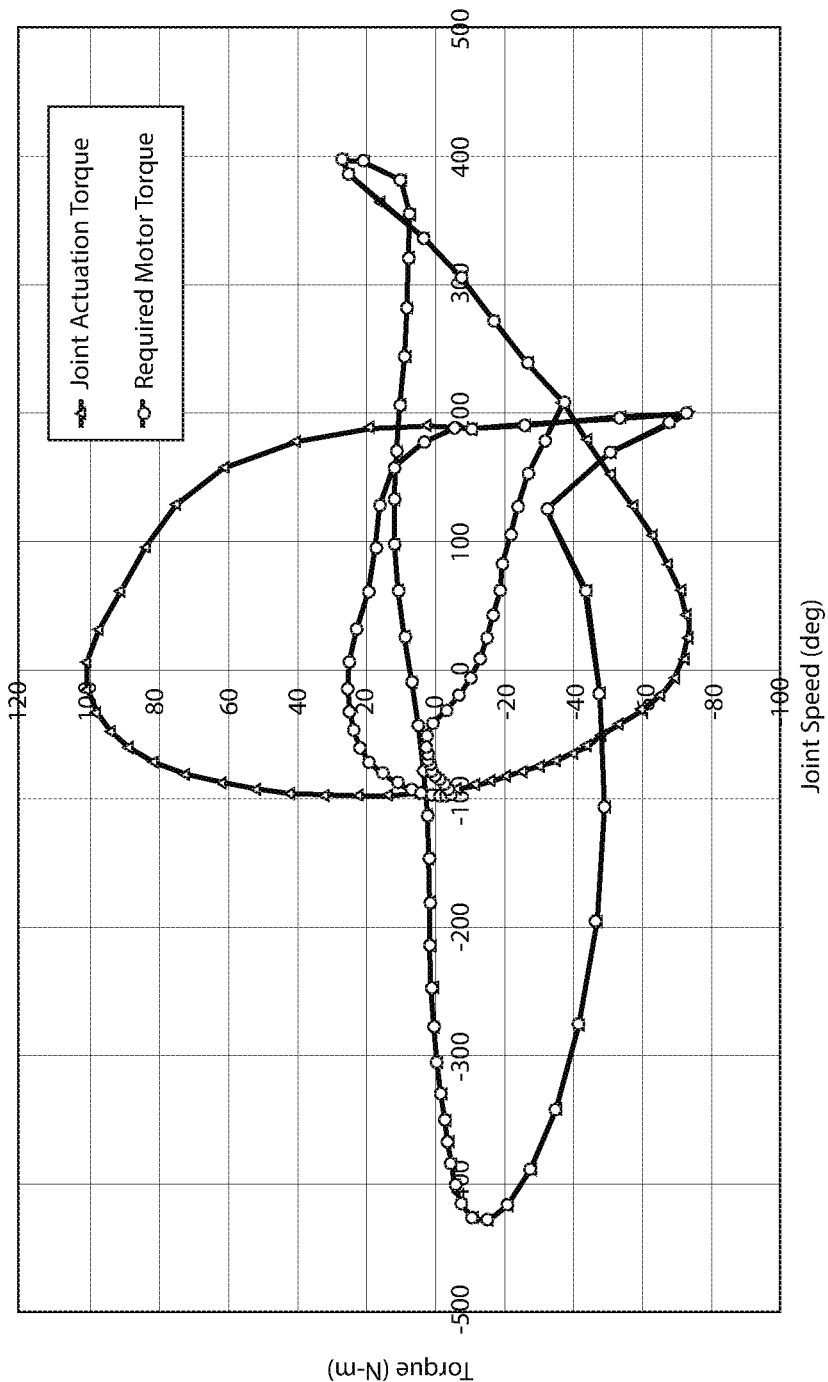
FIG. 3C is a graph illustrating performance of a clutched joint module in accordance with an example of the present disclosure.

FIG. 3C is a graph illustrating performance of an exoskeleton having a clutched joint module with a quasi-passive elastic actuator operating in parallel with a primary actuator, the joint module having a joint stiffness of 7 N-m/degree, associated with the human knee joint, in one example. More specifically, the graph shows joint torque (N-m) vs. joint speed (deg./sec) for walking at 3.5 mph with a 50 lb. payload. The plotted "triangular" labeled line ("joint actuation torque") represents the required overall torque to accomplish the prescribed joint trajectory (e.g., the torque required to rotate a knee), while the plotted "circular" labeled lines ("spring reaction torque") represents the part of the gait where an elastic response can be created by engaging and disengaging the quasi-passive elastic actuator in a timely manner, as exemplified herein.

As illustrated by this "circular" labeled line, the resulting peak torque is substantially reduced (approximately 25 N-m) vs. the normalized torque requirement (approximately 100 N-m) of the "triangular" labeled line. That is, normally (i.e., without incorporating a clutched joint module having an elastic actuator) the torque requirement is peaked at approximately 100 N-m; however, when incorporating a clutched joint module having an elastic actuator as disclosed herein, the resulting peak torque can be only approximately 20 N-m, thus significantly reducing power requirements for the same gait cycle and operating conditions. This is because the clutched joint module stores energy during a first gait movement (via the quasi-passive elastic actuator), and then releases that energy during a second gait movement to apply an augmented torque that can be applied in parallel with a torque applied by a primary actuator (e.g., a geared motor) of the clutched joint module. Of course, other factors play a role in these results, such as weight, payload, etc. In any event, these graphs illustrate that much less on-board power is required by the powered motor to appropriately actuate a joint when used in conjunction with a selectively controllable quasi-passive elastic actuator, as further exemplified below. The use of a parallel elastic actuator effectively reduces the requirement for motor torque as the elastic actuator is engaged and disengaged in a timely manner, such as during specific phases of a gait cycle. Similar plots or graphs can be shown for hip joints, ankle joints, shoulder joints, and elbow joints. In some cases, the elastic actuator can be engaged full-time for the gait cycles of these joints.

Figure 4B:
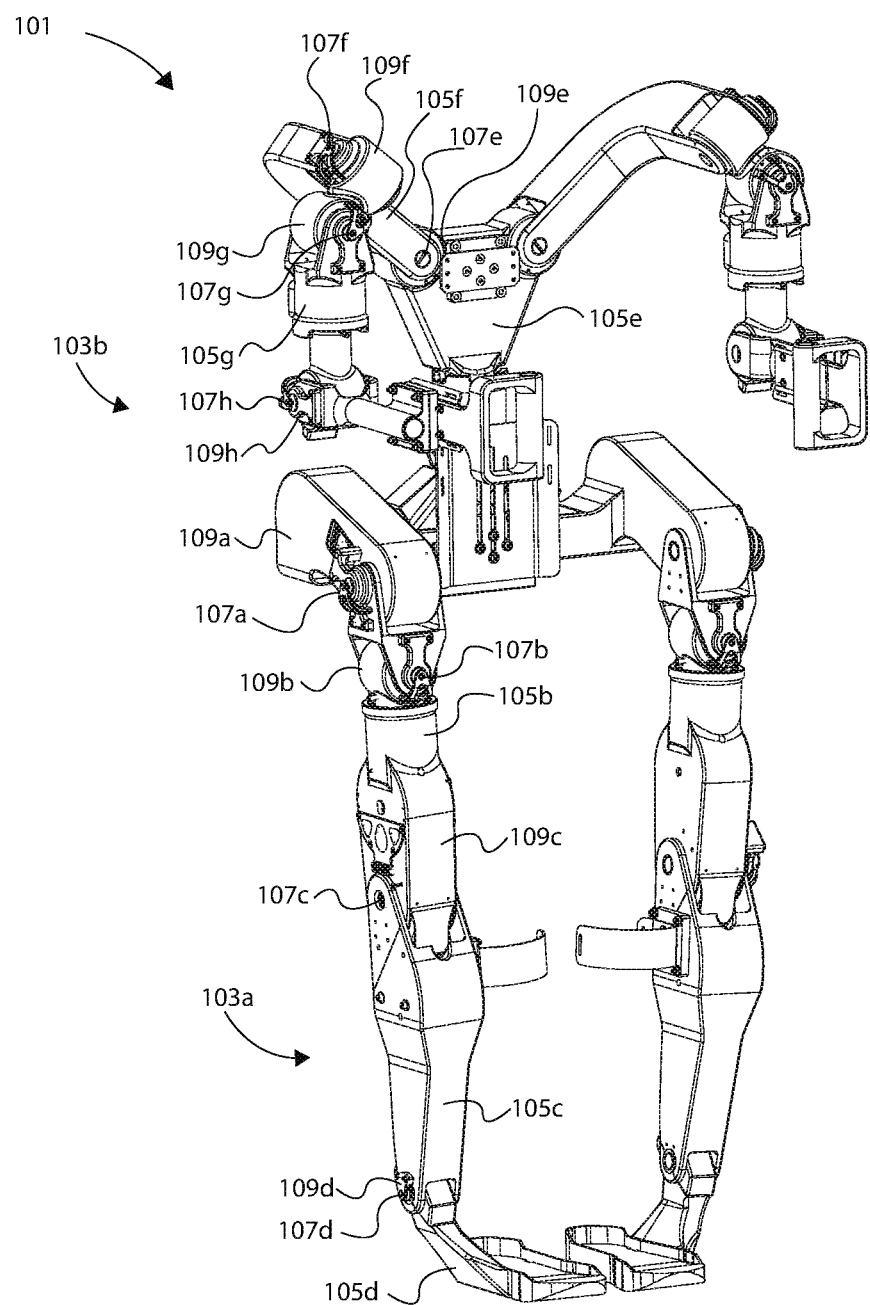
FIG. 4B is an isometric view of the robotic exoskeleton of FIG. 4A.
Figure 4C:
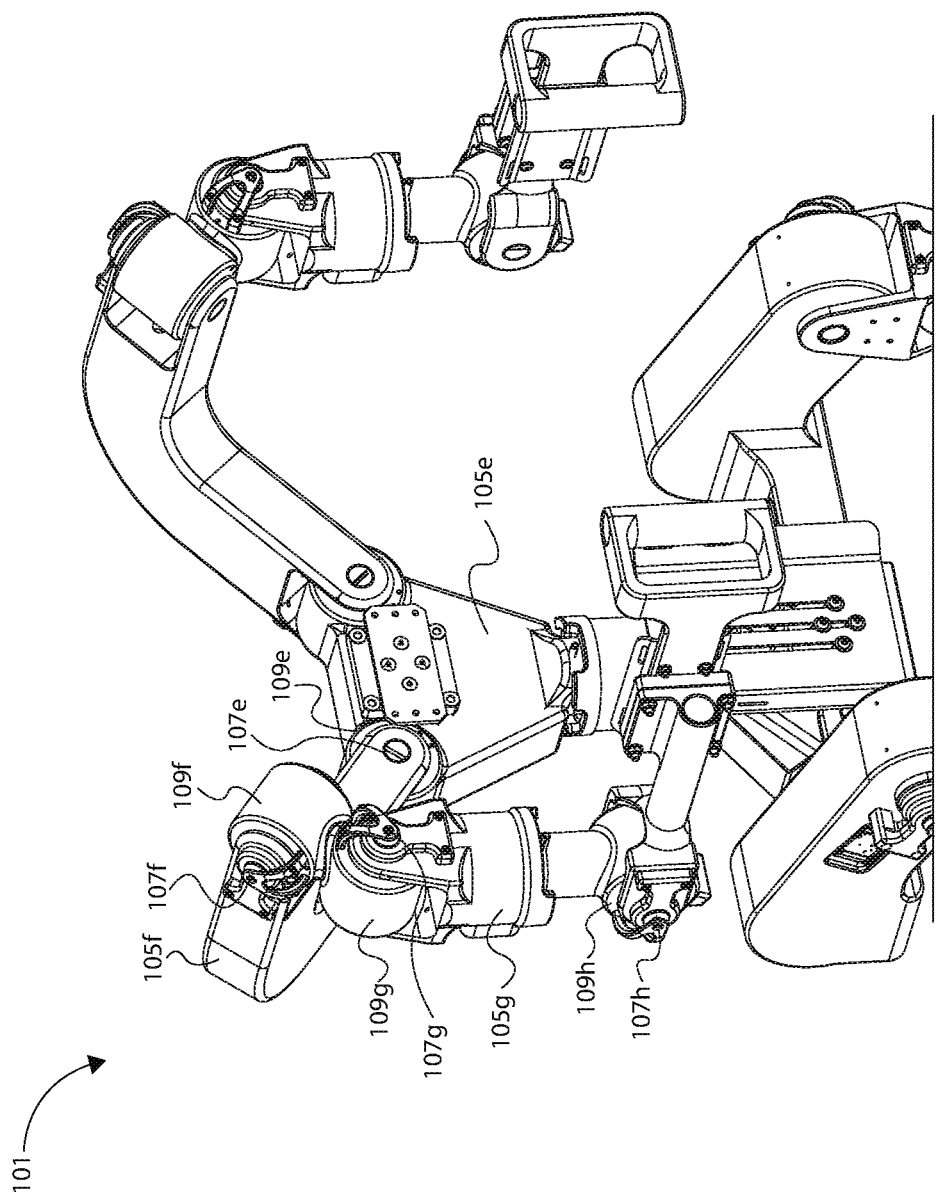
FIG. 4C a is close-up isometric view of the robotic exoskeleton of FIG. 4A.

FIGS. 4A-4C show isometric views of an exemplary robotic assembly 101 in the form of an exoskeleton wearable or usable by a human operator. The robotic assembly 101 could alternatively be a humanoid robot, or other robotic assembly as discussed above. As shown, the robotic assembly 101 can be configured as a full-body exoskeleton (i.e., an exoskeleton having both a lower body portion and an upper body portion). However, this is not intended to be limiting as the exoskeleton can comprise only a lower body exoskeleton (i.e., some or all of the lower body portion), or only an upper body exoskeleton (i.e., some or all of the upper body portion).

The robotic assembly 101 can comprise left and right exoskeleton limbs. The right exoskeleton limb 103 can comprise a plurality of lower body support members 105a-d. The support members 105a-c can be coupled together for relative movement about a plurality of respective joints 107a-c defining a plurality of degrees of freedom about respective axes of rotation. As described in U.S. patent application Ser. No. 15/810,108, filed Nov. 12, 2017, which is incorporated by reference in its entirely herein, the hip joint 107a and knee joint 107c can each comprise a tunable actuator joint module 109a and 109c that can comprise a tunable quasi-passive elastic actuator, as shown in FIGS. 4A and 4B, having a rotary air spring device as an elastic element or component. Alternatively, the hip and knee joints 107a and 107c can each comprise a clutched joint module, such as described by the present disclosure. Joints 107b and joint 107d can also each comprise a clutched joint module 109b and 109d, respectively, as described herein.

Similarly, the right exoskeleton limb 103b can comprise a plurality of upper body support members 105e-h coupled together for relative movement about a plurality of joints 107e-h defining a plurality of degrees of freedom about respective axes of rotation (see FIG. 4c for a closer view). Each joint 107e-h can comprise a clutched joint module 109e-h, respectively, as described herein. Notably, as further described below, each clutched joint module can be provided in a compact form, meaning that the particular axis of rotation of the joint, joint 107e for instance, is substantially collinear with the primary components, and the axes of rotation of the primary components, of the clutched joint module, clutched joint module 109e for instance (e.g., primary actuator, planetary transmission(s), clutch mechanism(s), quasi-passive elastic actuator(s)), these being arranged along and configured to be operable about the axis of rotation, as further exemplified below. Thus, each clutched joint module can provide a particular high-torque output in a compact form, such as a clutched joint module that is generally cylindrical and that locates the mass of the module near to the axis of rotation.

FIGS. 5A-5F illustrate a clutched joint module 200 according to an example of the present disclosure, which can be incorporated as, or in other words, can comprise or define a joint of a robotic assembly (e.g., 100, 101).

The clutched joint module 200 can comprise a primary actuator 202, a quasi-passive elastic actuator 204 (FIG. 5D), and a clutch mechanism 206 operatively coupled to each other, and each situated or arranged along and operable about an axis of rotation 210. As further detailed below, an input member 208a and an output member 208b (FIG. 5A) can be directly or indirectly coupled to respective support members of the robotic assembly, which support members are rotatable relative to each other about the axis of rotation 210 of the joint, which can correspond to a degree of freedom of a human joint. For instance, the clutched joint module 200 can be incorporated into the robotic assembly 101 as clutched joint module 109f of FIG. 4C that defines, at least in part, the joint 107f comprising a shoulder joint having a flexion/extension degree of freedom. Note that input and output members 208a and 208b are shown generically as members coupled to their respective components, but they can take many different forms and configurations of suitable input and output members or components that are coupleable to robotic support members, for instance.

The primary actuator 202 can comprise a motor 212 and, optionally, a transmission, such as a first planetary transmission 214 and, further optionally, a second transmission 216, such as a second planetary transmission. The motor 212 is operable to apply a primary torque to the output member 208b for rotation about the axis of rotation 210, and the quasi-passive elastic actuator 204 (e.g., one having an elastic component in the form of a torsional coil spring) is selectively operable to store energy, such as during a first rotation of the joint module 200, and to release energy in the form of augmented torque to be applied to the output member 208b along with the primary torque applied by the motor 212 (the two torques being combined to generate an output via the output member 208b).

The clutch mechanism 206 is operable to selectively control the quasi-passive elastic actuator 204 and the generation of the braking force or application of the augmented torque. Indeed, a braking force can be generated to restrict rotation of the joint in some operational scenarios (e.g., scenarios where the primary actuator is active or not active to produce a primary torque, but where rotation of the joint is desired), or an augmented torque can be generated and applied in combination with a primary torque to assist in rotation of the output member and the joint, as discussed below.

Figure 5A:
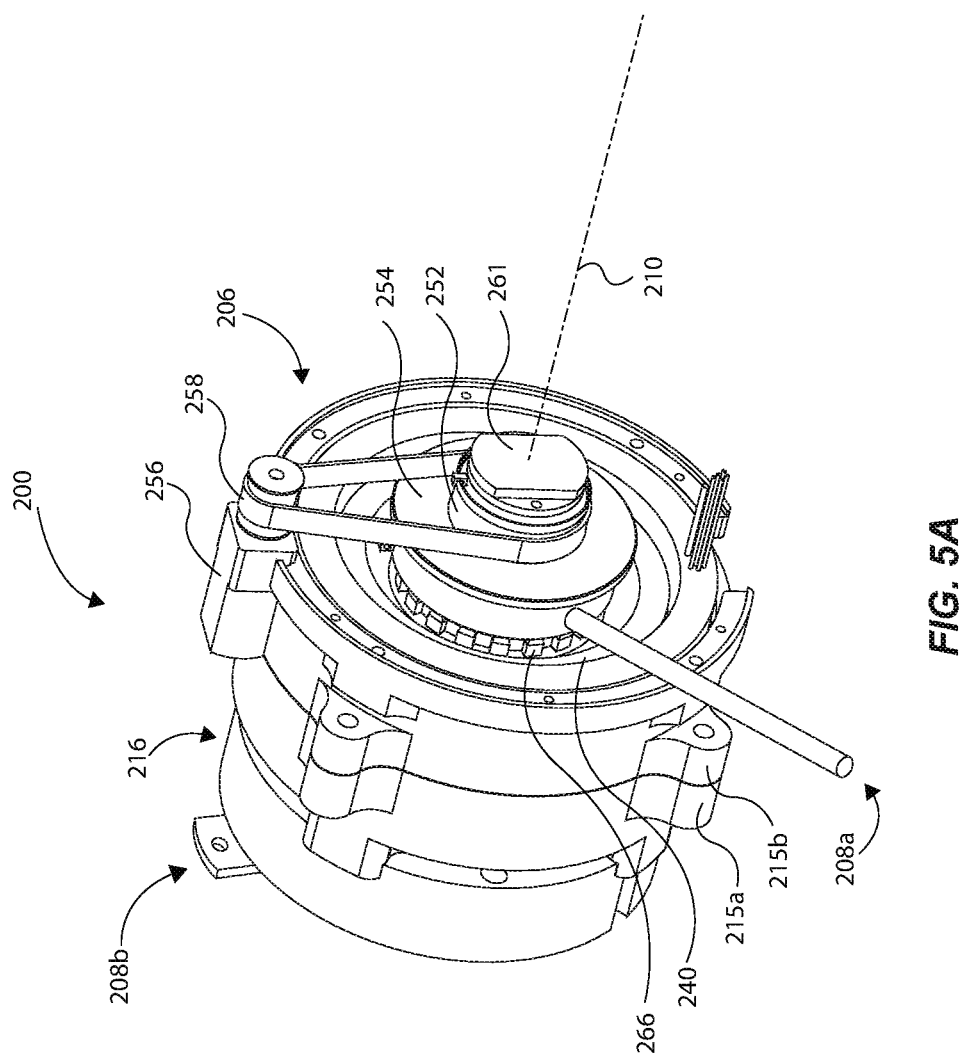
FIG. 5A is an isometric view of a clutched joint module in accordance with an example of the present disclosure.
Figure 5B:
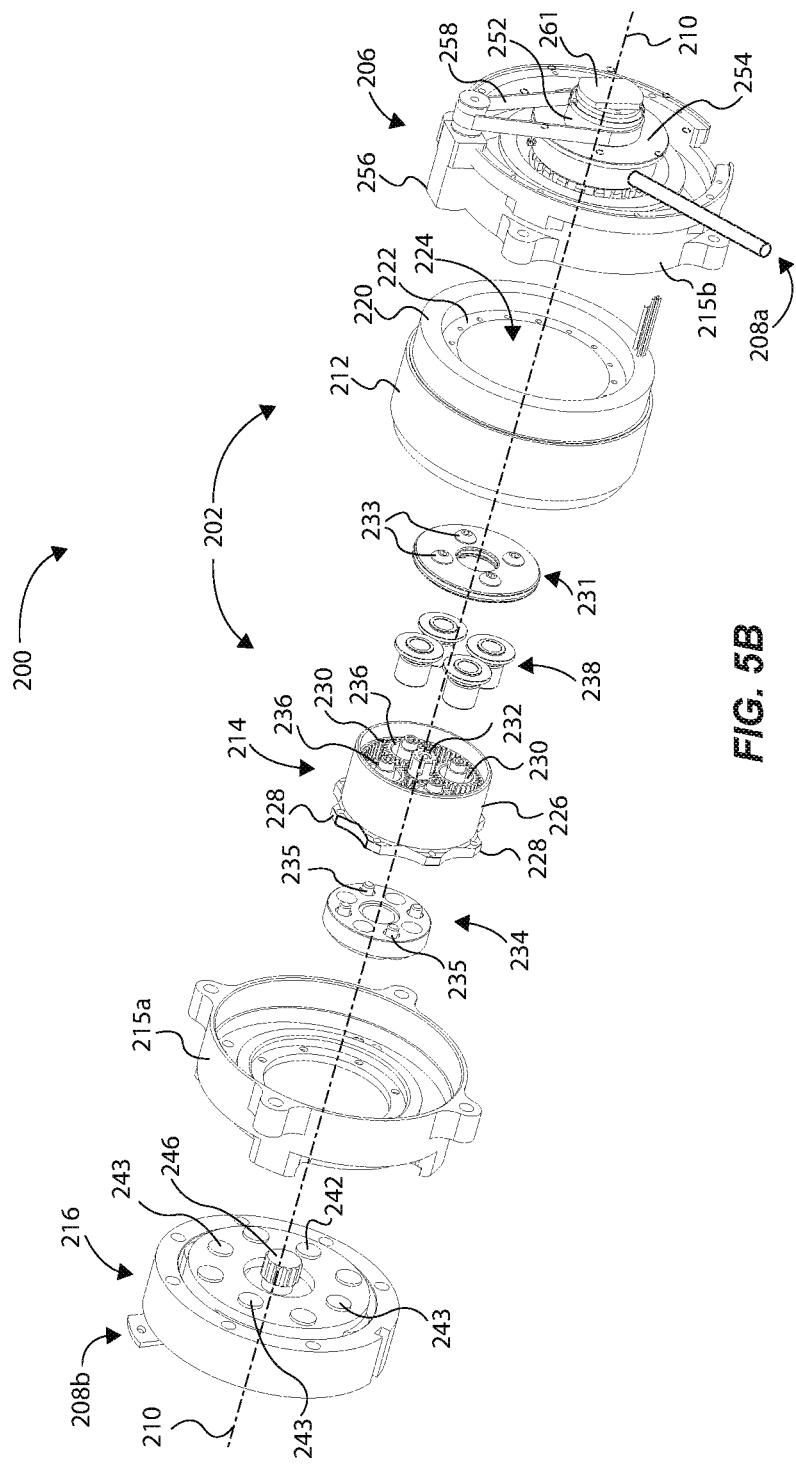
FIG. 5B is an exploded view of the clutched joint module of FIG. 5A.
Figure 5C:
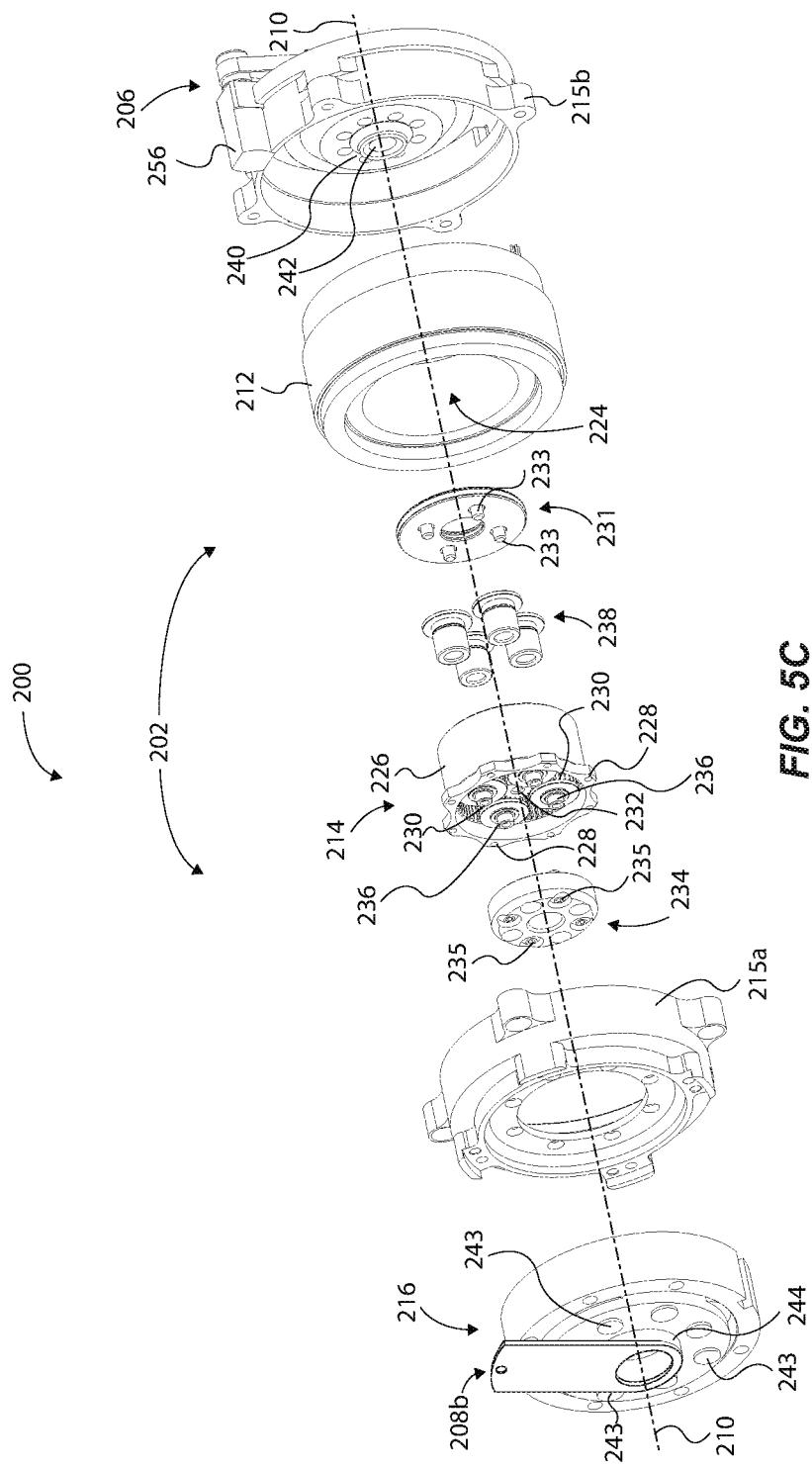
FIG. 5C is an exploded view of the clutched joint module of FIG. 5A.

With reference to FIGS. 5A-5C, a first support frame 215a and a second support frame 215b can be coupled together (via fasteners not shown) and can retain and support the motor 212 and the first planetary transmission 214, and can support the clutch mechanism 206.

As further detailed below, the quasi-passive elastic actuator 204 is operable to selectively apply an augmented torque or to generate a braking force (when in an elastic configuration or mode or state) upon a rotation of the input member 208a (e.g., where the rotation is either actively carried out using the primary actuator, or passively carried out, such as rotation of a joint under the influence of gravity of some other externally applied force that induces rotation) when the clutch mechanism 206 is in the engaged state, and is operable to selectively release energy (also when in the elastic configuration or mode or state) upon a rotation of the input member 208a (in the same or a different direction as the rotation for storing the energy), when the clutch mechanism 206 is in the engaged state, to apply an augmented torque to the output member 208b in parallel with the primary torque applied by the primary actuator 202, in this case the motor 212. The quasi-passive elastic actuator 204 is further operable to neither store nor release energy (when in an inelastic configuration or mode or state) when the clutch mechanism 206 is selected to be in the disengaged state. In this inelastic state, the input member 208a is in "free swing" relative to the output member 208b, meaning that negligible resistance is applied within the clutched joint module 200 via the quasi-passive elastic actuator 204 (so that the quasi-passive elastic actuator 204 does not have a stiffness value that would restrict rotation of the input member 208a relative to the output member 208b). The clutch mechanism 206 can also move from an engaged state to a disengaged state to dissipate any stored energy (i.e., dissipate any braking force generated, such as when the braking force no longer needed). Thus, the quasi-passive elastic actuator 204 is selectively switchable between the elastic state and the inelastic state via operation of the clutch mechanism 206. One advantage is that the quasi-passive elastic actuator 204 can be caused to apply, at select times, an augmented torque in parallel with the primary torque applied by the motor 212, which therefore applies a combined torque to rotate the output member 208b, thereby reducing the power requirements/demands of the motor 212. With the advantage of an augmented torque, the motor 212 selected can be of a smaller size and a lower power dissipation than otherwise would be required by a system without the assistance of the augmented torque provided by the quasi-passive elastic actuator 204. Note that the quasi-passive elastic actuator 204 and the clutch mechanism 206 can be "coupled to" the input member 208a as shown, or at any point between various components situated between the input and output members, such as between the motor 212 and the output member 208b (and between or adjacent any one of the transmissions).

In examples described herein, "selective" can mean that the clutched joint module can be controlled in real-time, such as to vary a magnitude and timing of a braking force, vary a magnitude and timing of compression of the elastic component of the quasi-passive actuator and the storing and releasing of energy therein, or vary a magnitude and timing of a primary torque generated by the primary actuator depending upon different operating conditions, operating states, different demands of the robotic system, or as desired by the operator. Selective control can mean that the quasi-passive elastic actuator can be operated in conjunction with the primary actuator all or some of the time or for a desired duration of time. In addition, "selective" can also mean, in examples, that one or more operating parameters or the output performance of the clutched joint module can be controlled and varied in real-time as needed or desired. Operating parameters or output performance can include, but is/are not limited to, a magnitude of the augmented torque to be applied, a magnitude of the braking force generated, the stiffness or elasticity of the elastic actuator, the zero or null point of actuation of the elastic actuator, and others.

In one example, the motor 212 is a high-performance Permanent Magnet Brushless DC motor (PM-BLDC), which can be a variant of a frameless torque motor with winding optimized to achieve the desired maximum torque and speed while operating using a 48 VDC supply and a high-performance COTS controller, such as electric motor MF0127-032 marketed by Allied Motion.

With reference to FIG. 5B, the motor 212 can comprise a stator 220 and rotor 222 rotatable relative to each other (in a typical fashion for commercially available frameless brushless motors). Thus, the motor 212 of the primary actuator 202 comprises a cylindrical void 224 about the central area of the rotor 222. Advantageously, the first planetary transmission 214 can be positioned (at least partially) within the cylindrical void 224 of the motor 212, which provides a low-profile, compact geared motor configuration because the first planetary transmission 214 and the motor 212 are packaged together, as shown and described.

In the present example, the first planetary transmission 214 can comprise a 4:1 geared transmission. Thus, in one example, the first planetary transmission 214 can comprise an outer housing 226 attached to the first support frame 215a via fasteners (not shown) through apertures 228 of the outer housing 226. The outer housing 226 comprises inner gear teeth formed around an inner surface of the outer housing 226. Such gear teeth can be configured to engage corresponding gear teeth of each of four planet gears 230 (2/4 labeled). A sun gear 232 can be disposed centrally between the four planet gears 230 and along the axis of rotation 210, with the sun gear 232 comprising teeth operable to engage the teeth of each of the four planet gears 230 (see FIGS. 5B and 5C).

Here, the outer housing 226 can comprise the stationary component of the planetary transmission 214, and the planet gears 230 can rotate about their own central axis and around the axis of rotation 210. A carrier plate 234 can be fastened to carrier pins 236 (2/4 labeled) via fasteners 235 (2/4 labeled). The carrier pins 236 can each be rotatably interfaced through the hollow tubular body of each planet gear 230. Four rear bushings 238 can each be coupled to a respective carrier pin 236, and a carrier pin plate 231 can be fastened to the carrier pins 236 through the bushings 238 via four fasteners 233 to maintain orientation of the planet gears 230 as they rotate.

Figure 5D:
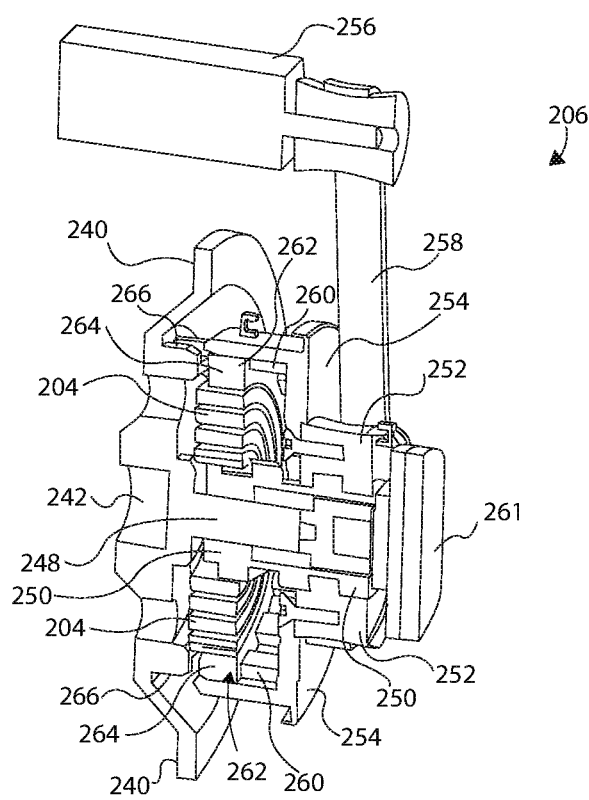
FIG. 5D is a cross sectional view of the clutch mechanism of the clutched joint module FIG. 5A.
Figure 5E:
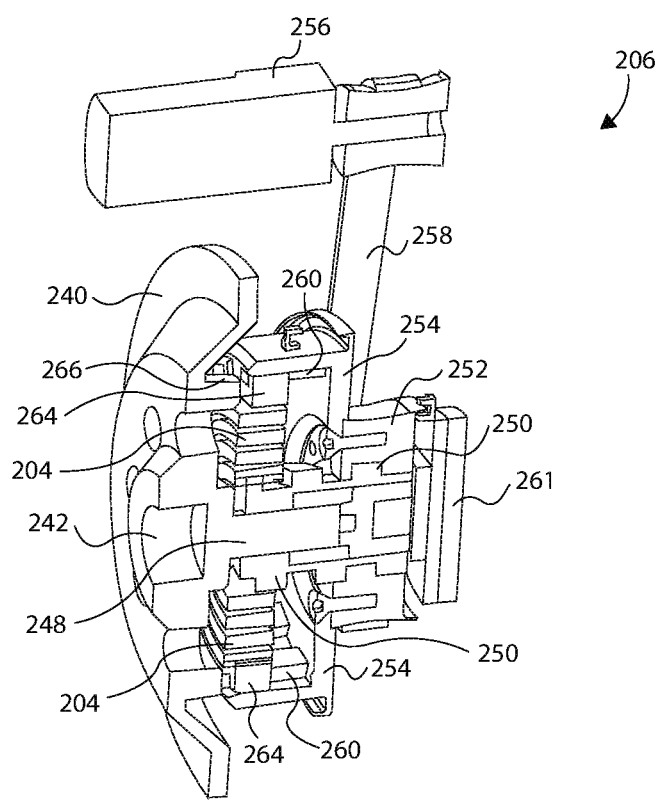
FIG. 5E is a cross sectional view of the clutch mechanism of the clutched joint module of FIG. 5A, from another perspective.

The sun gear 232 can be coupled to a rotary transfer component 240 of the clutch mechanism 206 (FIGS. 50-5E). The rotary transfer component 240 can comprise a central coupling portion 242 that interfaces with the sun gear 232. The rotary transfer component 240 can be coupled to the rotor 222 of the motor 212 by fasteners (not shown) about a perimeter of the rotary transfer component 240. Therefore, upon receiving a control signal, the rotor 222 drives/rotates the rotary transfer component 240, which drives/rotates the sun gear 232, which drives/rotates the carrier plate 234 (via planet gears 230 and carrier pins 236). The carrier plate 234 then drives/rotates a sun gear 246 of the second planetary transmission 216 (FIG. 5B), which ultimately drives/rotates the output member 208b via the planet gears 243 and the carrier 244 of the second planetary transmission 216.

Thus, the present example provides a 16:1 final drive transmission from the motor 212 to the output member 208b. Other planetary transmission types and gear reduction schemes can be used instead of a 4:1 transmission, such as a 3:1 planetary gear scheme.

To reduce build height, as well as to provide other advantages, the first planetary transmission 214 can be configured for positioning inside of the rotor of the motor 212. Depending on the motor selected, the inside diameter of the rotor can dictate the maximum outside diameter of the planetary transmission. Once the planetary ring has been constrained by its outside diameter, there are a limited amount of options for gear ratios and output torques available. The output ratio can be determined from the ratio of the number of teeth on the ring gear to the number of teeth on the sun gear. To obtain a higher reduction in the compact design of the planetary unit, the sun gear diameter can be reduced, which generally corresponds to less power transmission. The capacity to transmit higher torques is reduced with the smaller sun gear. A balance of reduction and strength can be found for a planetary unit that will physically fit inside the motor rotor. By implementing a helical cut gear, higher forces can be transmitted on the gear teeth making the unit stronger. A wider tooth can also improve the load carrying capacity of the gear, however this can increase the weight as well. Multiple stages of a planetary transmission can be cascaded (e.g., 214 and 216) to produce extremely high gear reduction in a relatively compact package, particularly one about the axis of rotation of the joint. In addition, the sun gear can make contact with several teeth simultaneously so the contact ratio is much higher than a conventional spur gear transmission. In some examples, a single stage planetary transmission can achieve efficiency of around 97%. At higher RPM, gear noise can be an issue, especially for multiple stage planetary units. Another benefit of the planetary transmission arrangement discussed herein is the fact that the transmission can be located in-line with the motor, which allows for compact mounting configurations within the joint module 200 of the robot or robotic assembly. Other examples may locate the transmission offset from one or more other components of the clutched joint module, with the transmission being operable with the primary actuator.

As shown in FIGS. 5B and 5C, the motor 212, the first and second planetary transmissions 214 and 216, and the output member 208b can each operate or rotate about substantially the same axis of rotation as the axis of rotation 210 of the clutched joint module 200 (i.e., the axis of rotation of the corresponding joint of the robot or robotic assembly), which axis of rotation in some cases, can also correspond to the axis of rotation of a human joint, such as an operator in an exoskeleton. Said another way, each axis of rotation of the primary actuator (e.g., the motor 212), the first and second planetary transmissions 214 and 216, and the output member 208b can be arranged to be collinear or substantially collinear with the axis of rotation 210. This locates the mass of such components close or near to the axis of rotation of a particular joint, which further minimizes power requirements by the motor 212 to actuate the joint.

It should be appreciated that the planetary transmissions exemplified herein can be replaced (or supplemented with) other transmission types, such as harmonic, cycloidal, worm, belt/chain, crank, four-bar linkage, backhoe linkage, bell crank, and continuously variable, for instance. And, various torque-transmitting devices can be operatively coupled between the transmissions, such as one or more belts or linkages or gears or tendons (or combinations of such). Moreover, the transmission(s) can be arranged to have an axis of rotation that is offset (e.g., oriented in a direction along a plane that is orthogonal or at some other angle) from the axis of rotation of the primary actuator(s) of the examples of the present disclosure (some other position other than collinear). Moreover, various transmissions can be arranged to provide different gear reductions from input to output, including a relatively high gear reduction (e.g., 20:1, or more), or a relatively low gear reduction (e.g., 1:1), or any gear reduction between these, depending on the particular application. In some examples, the torque-transmitting devices can allow the primary actuator to be remotely located away from the output (i.e., the primary actuator is located a given distance away from the output of the clutched joint module, but operably connected thereto via the torque-transmitting device), wherein the remotely located primary actuator can be actuated and its torque transferred to the output of the tunable actuatable joint module corresponding to a joint of the robotic system. For instance, the primary actuator 202 could be located at a lower back area of an exoskeleton (e.g., FIG. 4A), while such alternative torque-transmitting device(s) could transfer the primary toque from the lower back area to an output member located in the clutched actuator joint module for the hip joint for actuating the hip joint.

With particular reference to FIGS. 5B-5E, as introduced above the quasi-passive elastic actuator 204 is operable to apply an augmented torque to rotate the output member 208b, along with the primary torque applied by the primary actuator 202. Thus, the quasi-passive elastic actuator 204 is switchable between an elastic configuration and an inelastic configuration via operation of the clutch mechanism 206 for selectively controlling application of the augmented torque applied by the quasi-passive elastic actuator 204. The quasi-passive elastic actuator 204 is also operable to generate a braking force that can restrict rotation in the joint between the input and output members. This can also be selectively controlled and varied via the clutch mechanism 206.

The quasi-passive elastic actuator 204 can comprise an elastic element in the form of a mechanical elastic component or spring. As in the example shown, the elastic element can specifically comprise a torsional coil spring that stores mechanical energy when loaded. In this example, the clutch mechanism 206 can comprise the rotary transfer component 240 (coupled to the motor 212, as discussed above) that comprises a central shaft 248 that is rotatably interfaced through an opening of a splined shaft 250. The splined shaft 250 includes a male helical splined profile that interfaces with a female helical splined profile of a splined collar 252. The splined collar 252 is fastened to a movable engagement component 254, and rotatably coupled to a clutch actuator 256 (e.g., electric motor) via a transmission belt 258.

The movable engagement component 254 comprises inner teeth or engagement features 260 formed annularly around the inside of a perimeter wall of the movable engagement component 254. The inner teeth or engagement features 260 are engaged to outer teeth or engagement features 262 of an engagement ring gear 264, which is coupled to the quasi-passive elastic actuator 204 in the form of the torsional coil spring. In this manner, one end of the quasi-passive elastic actuator 204 is attached to an inner surface of the engagement ring 264, and the other end of the quasi-passive elastic actuator 204 is attached to the splined shaft 250. The input member 208a can be coupled to the movable engagement component 254. Accordingly, rotation of the input member 208a about the axis of rotation 210 causes rotation of the movable engagement component 254 (whether the clutch mechanism 206 is engaged or disengaged). Note that the various teeth or engagement features can comprise various shapes and forms, such as protrusions that selectively engage with respective recessed portions of adjacent parts or components as shown. In one example, the rotary transfer component, the engagement ring, and the moveable engagement component may not have teeth or protrusions that engage with each other as described; instead, such components can be formed as plates having a particular shape that, when moved, engage with each other to lock up or bind up, similar to the plates discussed below regarding FIG. 6A.

FIGS. 5D and 5E show the clutch mechanism 206 in the disengaged state. In this manner, the inner teeth or engagement features 260 of the movable engagement component 254 are only engaged with the outer teeth or engagement features 262 of the engagement ring 264 (i.e., away from outer teeth or engagement features 266 of the rotary transfer component 240). Thus, the input member 208a, the movable toothed engagement component 254, and the engagement ring 264 freely rotate relative to the rotary transfer component 240 in this disengaged state. Therefore, the clutched joint module 200 is in a "free swing" mode as the input member 208a is freely rotatable relative to the output member 208b. To move the clutch mechanism 206 to the engaged state (thereby activating the quasi-passive elastic actuator 204 in the elastic state to store and/or release energy), the clutch actuator 256 receives a clutch control signal from a controller, which causes the clutch actuator 256 to rotate the transmission belt 258 in the clockwise direction, which causes clockwise rotation of the splined collar 252. Such clockwise rotation of the splined collar 252 causes the splined collar 252 to axially translate toward the movable engagement component 254 because of the male helical splined profile of the splined shaft 250. Such axial movement biases or pushes the movable engagement component 254 axially toward the rotary transfer component 240. Upon such axial movement of the movable engagement component 254, the inner teeth or engagement features 260 of the movable engagement component 254 engage with the outer teeth or engagement features 266 of the rotary transfer component 240. Such engagement results in an indirect, locking engagement of the engagement ring 264 with the rotary transfer component 240, such that they can rotate together in the same direction and at the same speed. Thus, the clutch mechanism 206 is caused to be in the engaged state, and the quasi-passive elastic actuator 204 in the elastic state, wherein rotation of the joint module 200 causes the torsional coil spring to be wound, in which case energy is stored, and unwound, where the stored energy is released. As the torsional coil spring is caused to unwind, energy from the torsional coil spring is released, an augmented torque applied by the torsional coil spring, for instance, is translated to the engagement ring 264, and then to the movable engagement component 254, and then to the rotary transfer component 240, and then to the sun gear 232 of the first planetary transmission 214 (FIGS. 5B and 5C), and so on (as described above), to rotate the output member 208b. Engaging the clutch mechanism 206, and winding of the torsional coil spring can also be used to generate a braking force that can be used to restrict movement of the output member relative to the input member. For example, upon rotation of the joint (either using the primary actuator or in response to an external force, such as gravity or a force impacting the robotic system) the clutch mechanism 206 can be engaged to actuate the quasi-passive actuator, wherein this will generate a braking force that restricts rotation of the joint. Furthermore, once stored, the energy can be dissipated (by disengaging the clutch mechanism 206) or released (by keeping the clutch mechanism 206 engaged) to apply an augmented torque that can be combined with a primary torque, as discussed herein.

Accordingly, while the clutch mechanism 206 is in the engaged state, the quasi-passive elastic actuator 204 can store energy and/or release energy as it is in its elastic state. Specifically, assume the torsional coil spring is wound in the clockwise direction from its central area, so that, upon a first clockwise rotation of the input member 208a about the axis of rotation 210, the quasi-passive elastic actuator 204 (e.g., torsional coil spring) stores energy. Such rotational movement can be the result of a gait movement of the robotic assembly (e.g., of a lower body exoskeleton) that causes a first robotic support member (e.g., 104e) to rotate about a second robotic support member (e.g., 104d), such as during a gait cycle between point B to C as shown in FIG. 2. Upon a second counterclockwise rotation (e.g., of 104e and 104d between points A to B of FIG. 2), the quasi-passive elastic actuator 204 can release its stored energy, thereby transferring an augmented torque to assist in rotation of the output member 208b, as detailed above. The described joint rotational directions and when energy is stored and released is not intended to be limiting as the clutch mechanism 206 can control the compressing of the elastic component within the quasi-passive elastic actuator to store and release energy in opposite joint rotation directions or in the same joint rotation direction.

Concurrently, the motor 212 of the primary actuator 202 can be operated to apply a primary toque (along with the augmented torque) to rotate the output member 208b about axis of rotation 210 to actuate the clutched joint module 200. Because the torque applied by the motor 212 is supplemented with the torque applied by releasing stored/recovered energy via the quasi-passive elastic actuator 204, the electric motor 212 can be selected from a group of smaller (e.g., less power dissipation) motors than would otherwise be needed, which contributes to the compact configuration of the clutched joint module 200, as also discussed above.

Upon a rotation of the input member 208a relative to the output member 208b (either clockwise or counterclockwise), the clutch actuator 256 can receive a clutch control signal that causes it to rotate the splined collar 252 in the counterclockwise direction, thereby pulling (i.e., axially translating) the movable engagement component 254 away from the rotary transfer component 240, which disengages the engagement ring 264 from the rotary transfer component 240. This causes the clutch mechanism 206 to be in the disengaged state (as shown on FIGS. 5D and 5E). As a result, the quasi-passive elastic actuator 204 neither stores nor releases energy (i.e., the quasi-passive elastic actuator 204 enters the inelastic configuration or state), wherein negligible resistance is applied by the quasi-passive elastic actuator 204 so that the clutched joint module 200 does not have a stiffness value restricting rotation of the input member 208a relative to the output member 208 (except for the resistance imparted by the gears of the planetary transmissions, for instance).

Various sensors, such as position sensors, force sensors, or both, can be operable within the joint module 200 to determine and measure a position or a force of the joint module 200, such that the quasi-passive actuator 204 can be engaged and disengaged as needed or desired. In one example, a position sensor 261 can be coupled to the splined collar 252 to determine the position of the coupled movable engagement component 254, which assists in determine to the position of the input member 208a relative to the output member 208b. Other position sensors can be incorporated with the joint module 200 to assist with such determination. Thus, each of such first, second, and third rotational movements of the input member 208a relative to the output member 208b (e.g., of a robotic joint) can be sensed by one or more position and/or force sensors (e.g., 261) associated with and/or coupled to the clutched joint module 200 to sense a direction, speed, and/or force associated with rotation of the clutched joint module 200. The one or more sensors can be coupled at various locations, such as at or near the input member 208a and/or output member 208b, at the transfer wheel 198, and/or other suitable locations of the clutched joint module 200. In one example, a particular position sensor 261 (e.g., Hall effect sensor) can sense a relative position of the input member 208a, and, upon the second rotation (discussed above), the position sensor 261 can communicate a position signal to a computer control system, having a central processing unit, that processes the position signal, and then ultimately transmits an appropriate clutch signal to the clutch actuator 265 to engage (or maintain engagement of) the clutch mechanism 206 (for instance), and/or transmits a primary actuator signal to the motor 212 to apply the primary torque, as discussed further herein.

In an example where the joint module 200 is incorporated as a shoulder joint (e.g., 109f) of an arm of an exoskeleton (FIG. 4A), assume a human operator wearing the exoskeleton desires to lift a 200 pound payload. As the operator moves the arm downwardly to reach and grab the payload (e.g., the first rotation of the shoulder joint), the clutch mechanism 206 can be controlled to enter the engaged state, such that the quasi-passive elastic actuator 204 stores energy during such rotation of the shoulder joint. Then, as the operator grabs and begins to lift the payload (i.e., a second rotation of the shoulder joint), the clutch mechanism 206 is maintained in the engaged state, where the quasi-passive elastic actuator 204 is caused to release stored energy (as discussed above) to apply an augmented torque to rotate the output member 208a (i.e., to assist lifting the payload). Concurrently, a primary control signal can be received by the motor 212, which exerts a primary torque (as discussed above) to apply a primary torque, along with the augmented torque, to rotate the output member 208b, thus facilitating the lifting of the load by the exoskeleton. Upon releasing the payload, the clutch mechanism 206 can be controlled to be operated to the disengaged state to remove any spring stiffness that may exist about the quasi-passive elastic actuator 204, thereby placing the joint module 200 in free swing mode so that the operator can lower the arm to a desired position without resistance or required actuation.

In some examples, the quasi-passive elastic actuator 204 can act as a gravity compensation mechanism to resist gravitational forces imposed on the robotic assembly, such as on an arm of an exoskeleton, so that the human operator does not need to use energy to hold the robotic arm at a desired location or orientation. This is because the torsional coil spring, for instance, can exert a counter biasing force away from or that acts against the gravitational pull (when the clutch is engaged) to maintain a certain position of the joint and the robotic support members coupled thereto (as well as the relevant part of an operator, if any, such as in the case of an exoskeleton).

Note that spring stiffness of the quasi-passive elastic actuator 204 is a function of the size, shape, material, etc. of the torsional coil spring, for instance. Thus, the magnitude of stiffness for a given joint module is selectable (e.g., during manufacture and selection of the torsional coil spring) for mission-specific payloads and terrain-specific gaits (or other movements) while the clutch mechanism can be controlled and operated to control when in time, or at what rotational positions/forces during the various rotational movements of the joint module 200 that the quasi-passive elastic actuator 204 is to be engaged for energy recovery/release during the support phase (i.e., the elastic configuration), for instance, and when it is disengaged so as to enter the free swinging phase (i.e., the inelastic configuration). Moreover, due to the nature of torsional coil springs, for instance, the greater the degree of rotation during energy storage, the amount of energy stored exponentially increases (as torsional coil springs can store energy in a nonlinear manner). In this manner, the torsional coil spring can act somewhat as a compressed gas chamber in terms of storing and releasing energy, but without the complexity of such pneumatic spring actuators.

FIGS. 6A-6G illustrate a clutched joint module 300 according to an example of the present disclosure, which can be incorporated as, or in other words, can comprise a joint of a robotic assembly (e.g., 100, 101).

The clutched joint module 300 can comprise a primary actuator 302, a quasi-passive elastic actuator 304 (FIG. 6B), and a clutch mechanism 306 operatively coupled to each other, and each situated or arranged along and operable about an axis of rotation 310. As further detailed below, an input member 308*a* and an output member 308*b* can be coupled to respective support members of the robotic assembly, which support members are rotatable relative to each other about the axis of rotation 310 of the joint, which can correspond to a degree of freedom of a human joint. For instance, the clutched joint module 300 can be incorporated into the robotic assembly 101 as clutched joint module 109*f* of FIG. 4C that defines, at least in part, the joint 107*f* comprising a shoulder joint having a flexion/extension degree of freedom. Note that input and output members 308*a* and 308*b* are shown generically as members coupled to their respective components, but they can take many different forms and configurations of suitable input and output members or components that are coupleable to robotic support members, for instance.

Figure 6A:
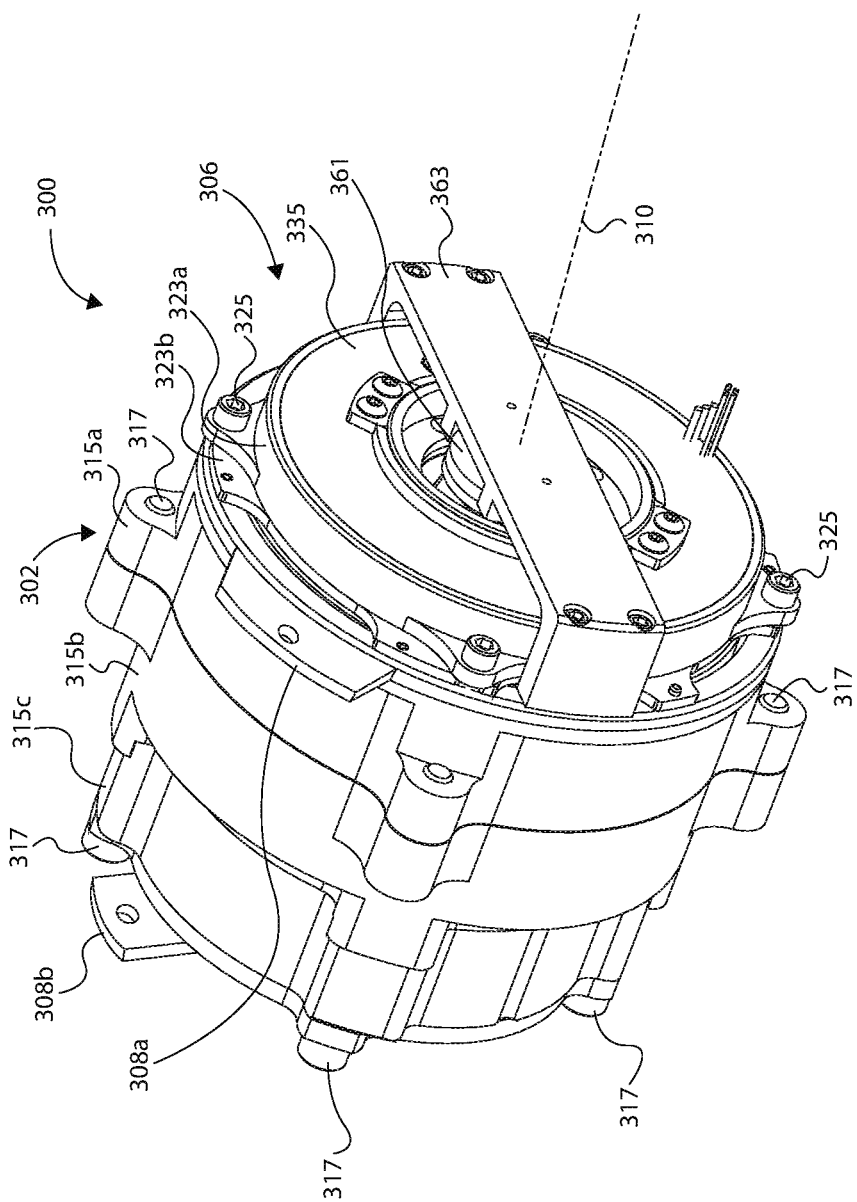
FIG. 6A is an isometric view of a clutched joint module in accordance with an example of the present disclosure.
Figure 6B:
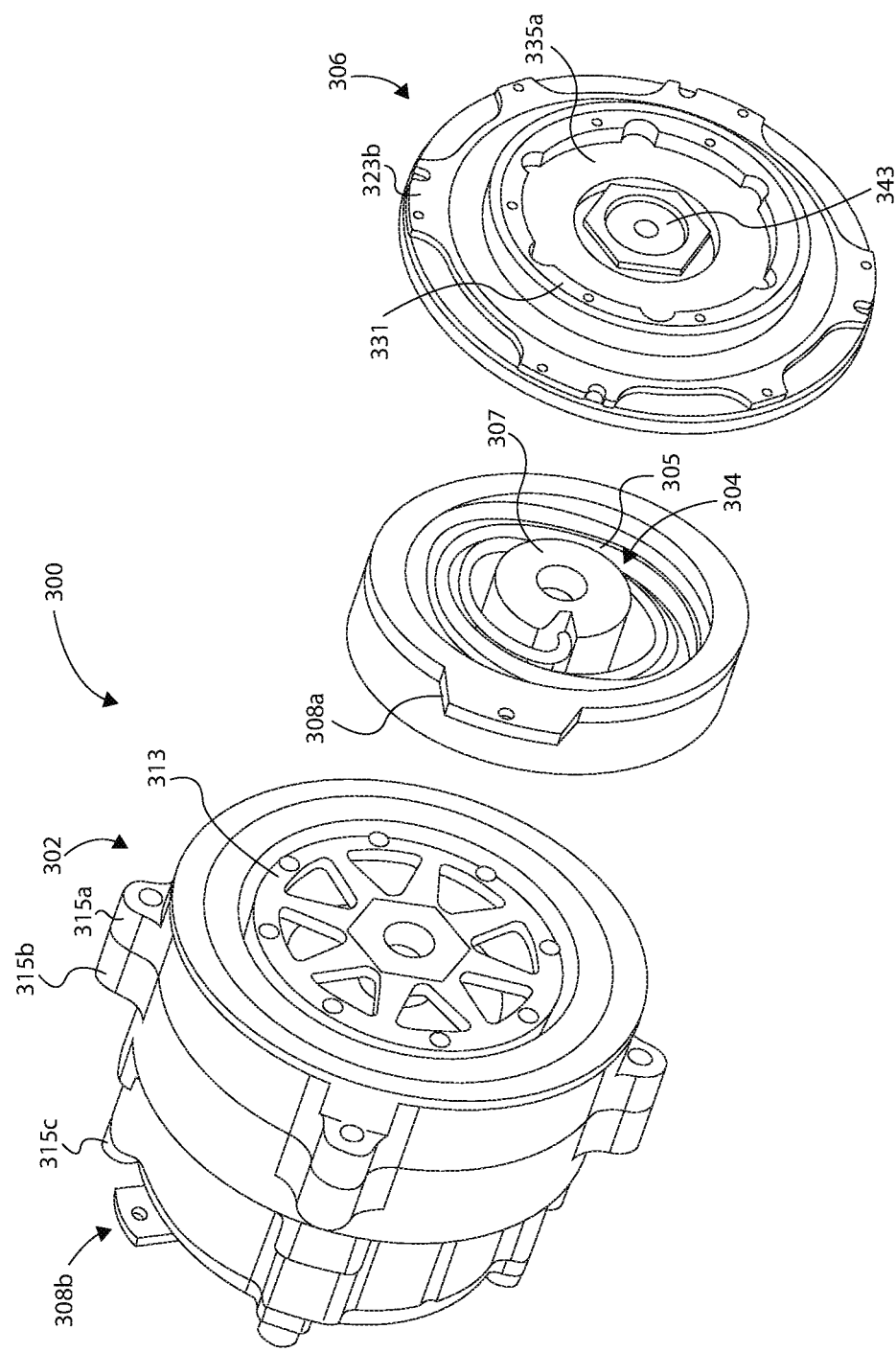
FIG. 6B is an exploded view of the clutched joint module of FIG. 6A.
Figure 6C:
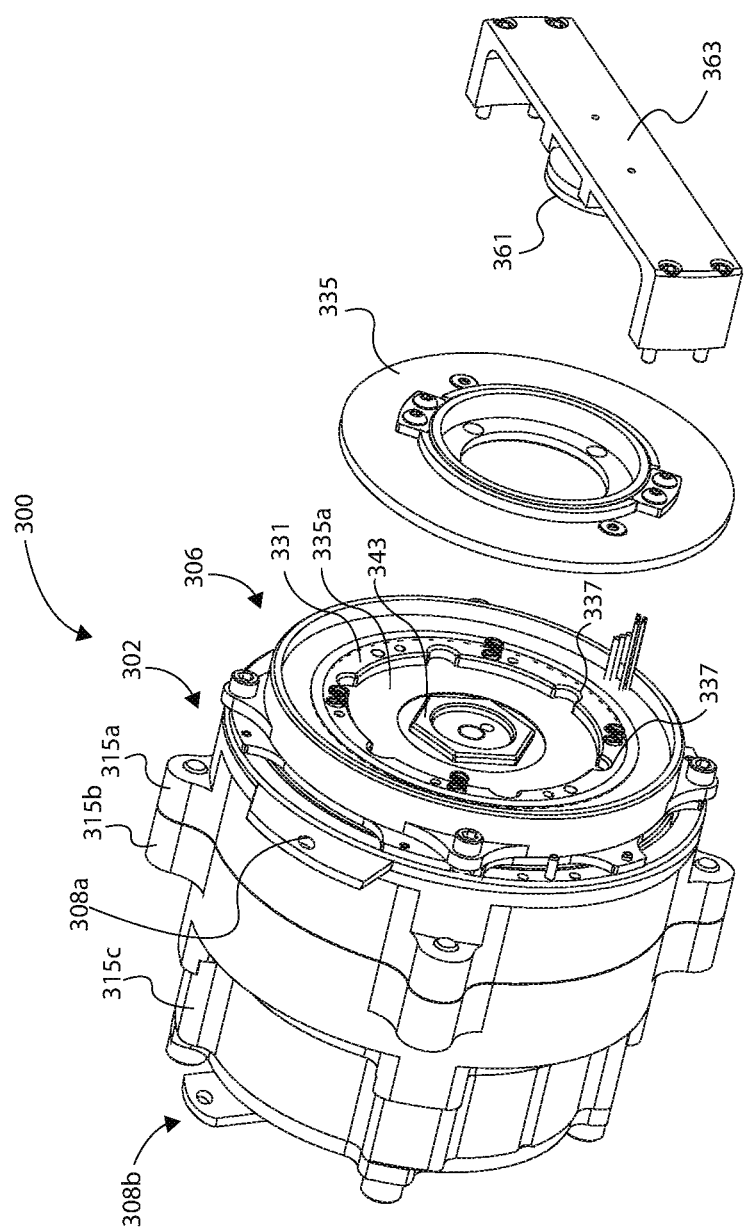
FIG. 6C is an exploded view of the clutched joint module of FIG. 6A.
Figure 6G:
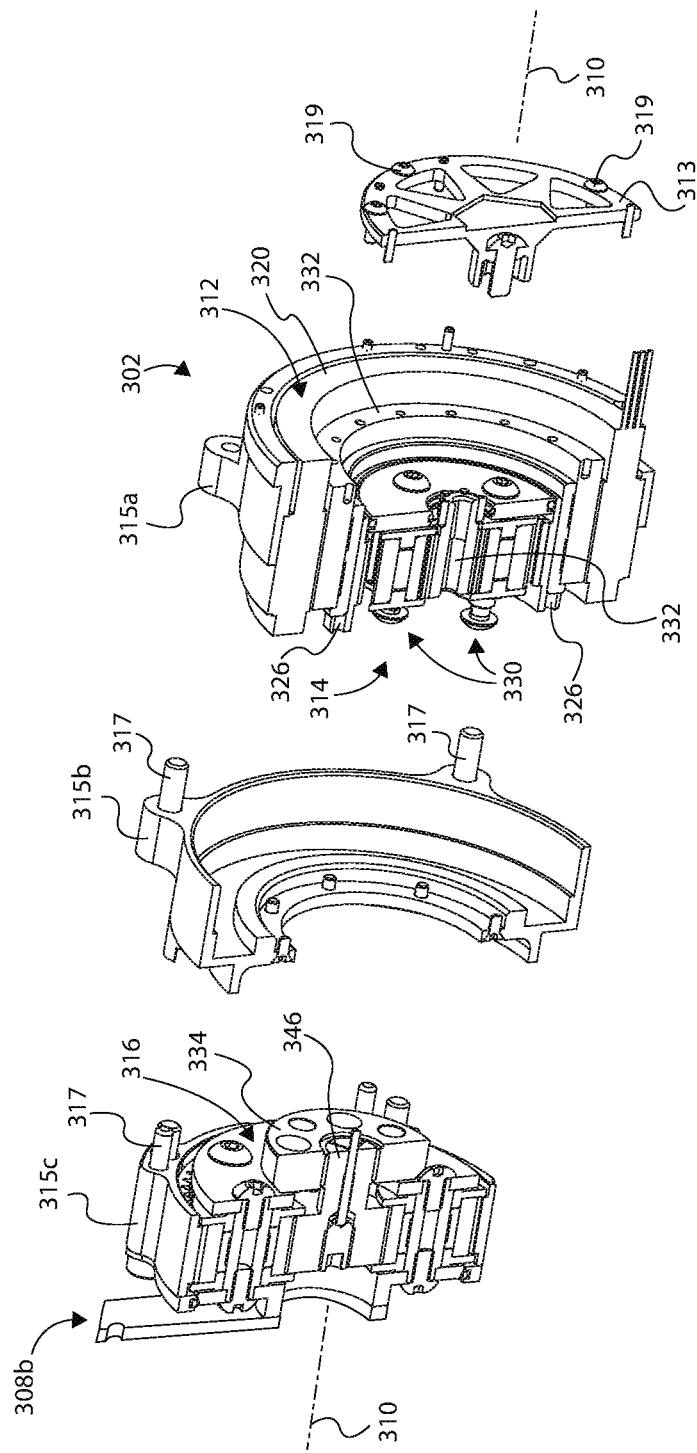
FIG. 6G is a cross sectional exploded view of a portion of the clutched joint module of FIG. 6A.

The primary actuator 302 can comprise a motor 312 and, optionally, a transmission, such as a first planetary transmission 314 and, further optionally, a second transmission, such as second planetary transmission 316 (FIGS. 6F and 6G). The motor 312 is operable to apply a primary torque to the output member 308*b* for rotation about the axis of rotation 310, and the quasi-passive elastic actuator 304 (e.g., one having an elastic component in the form of a torsional coil spring) is selectively operable to store energy during a rotation of the joint module 300, and to release energy in the form of augmented torque to be applied to the output member 308*b* along with the primary torque applied by the motor 312 (the two torques being combined to generate an output via the output member 308*b*). The clutch mechanism 306 is operable to selectively control the quasi-passive elastic actuator 304 and the generation of the braking force or application of the augmented torque. Indeed, a braking force can be generated to restrict rotation of the joint in some operational scenarios (e.g., scenarios where the primary actuator is active or not active to produce a primary torque, but where rotation of the joint is desired), or an augmented torque can be generated and applied in combination with a primary torque to assist in rotation of the output member and the joint, as discussed below.

The clutched joint module 300 can comprise a first support frame 315*a*, a second support frame 315*b*, and a third support frame 315*c* fastened together via various fasteners 317. The support frames 315*a-c* can retain and support the various components discussed herein, such as the motor 312, the planetary transmissions 314 and 316, the clutch mechanism 306, etc., as best shown on the cross sectional views of FIGS. 6F and 6G.

As further detailed below, the quasi-passive elastic actuator 304 is operable to selectively store energy or generate a braking force (when in an elastic or semi-elastic configuration or mode or state) upon a rotation of the input member 308*a* (e.g., where the rotation is either actively carried out using the primary actuator, or passively carried out, such as rotation of a joint under the influence of gravity of some other externally applied force that induces rotation) when the clutch mechanism 306 is in the engaged or semi-engaged state, and is operable to selectively release energy (also when in the elastic or semi-elastic configuration or mode or state) upon a rotation (in the same or a different direction as the rotation for storing the energy) of the input member 308*a*, when the clutch mechanism 306 is in the engaged or semi-engaged state, to apply the augmented torque to the output member 308*b* in parallel with a primary torque applied by the primary actuator 302, in this case the motor 312. The quasi-passive elastic actuator 304 is further operable in the inelastic state to neither store nor release energy during rotation of the joint (inelastic configuration) when the clutch mechanism 306 is selectively caused to be in the disengaged state. In this inelastic state, the input member 308*a* is in "free swing" relative to the output member 308*b*, meaning that negligible resistance is applied within the joint module 300 via the quasi-passive elastic actuator 304 (so that the quasi-passive elastic actuator 304 does not have a stiffness value that would restrict rotation of the input member 308*a* relative to the output member 308*b*), The clutch mechanism 136 can also move from an engaged or semi-engaged state to a disengaged state to dissipate any stored energy (i.e., dissipate any braking force generated, such as when the braking force no longer needed). Thus, the quasi-passive elastic actuator 304 is selectively switchable between the elastic state, the semi-elastic state, and the inelastic state via operation of the clutch mechanism 306. One advantage is that the quasi-passive elastic actuator 304 can be caused to apply, at select times, an augmented torque in parallel with the primary torque applied by the motor 312, which therefore applies a combined torque to rotate the output member 308*b*, thereby reducing the power requirements/demands of the motor 312. Thus, the selected motor 312 can be of a smaller size and a lower power dissipation than otherwise would be required by the robotic system without the assistance of the augmented torque provided by the quasi-passive elastic actuator 304.

By "selective" it is meant that the clutched joint module can be controlled in real-time, such as to vary a magnitude and timing of a braking force, vary a magnitude and timing of compression of the elastic component of the quasi-passive actuator and the storing and releasing of energy therein, or vary a magnitude and timing of a primary torque generated by the primary actuator depending upon different operating conditions, operating states, different demands of the robotic system, or as desired by the operator. Selective control can mean that the quasi-passive elastic actuator can be operated in conjunction with the primary actuator all or some of the time or for a desired duration of time. The term "selective" can also mean that one or more operating parameters or the output performance of the clutched joint module can be controlled and varied in real-time as needed or desired. Operating parameters or output performance can include, but is/are not limited to, a magnitude of the augmented torque to be applied, a magnitude of the braking force generated, the stiffness or elasticity of the elastic actuator, the zero or null point of actuation of the elastic actuator, and others.

In examples, "semi-engaged" can mean that the clutch mechanism is engaged, but not fully engaged nor disengaged, such that some slippage occurs within the clutch mechanism (i.e., there is a less than a 1:1 transfer of forces from the input of the clutch to the output of the clutch through the clutch mechanism, such that the clutch mechanism does not act as a rigid system). For example, in the case of the clutch mechanism having a plurality of plates, such as input and output plates, the semi-engaged state would mean that the plates are under a compression force sufficient to compress the plates together some degree, but that some relative movement (i.e., slippage) occurs between the plates (i.e., they are not completely locked up such that they rotate together and movement between them is not completely restricted) and a friction force is generated between them (e.g., a usable braking force). The term "engaged state" as used herein can include the semi-engaged state as these are also meant to describe at least a partially engaged state of the clutch mechanism, as well as to describe the clutch mechanism where the amount of slippage and thus the amount of the braking force (or augmented torque) is controllable and variable between the disengaged state where negligible braking force is generated and fully engaged where the clutch models a rigid connection member.

In examples where the quasi-passive actuator is caused to enter a "semi-elastic state" or mode of operation, the quasi-passive elastic actuator can be actuated to partially compress the elastic or spring component of the quasi-passive elastic actuator to store, and be enabled to release, an amount of energy or be enabled to generate a magnitude of a braking force that is less than what would otherwise be achieved if the quasi-passive elastic actuator were in a fully elastic state. Stated another way, "semi-elastic" describes that state in which there is a less than 1:1 transfer of energy or forces, due to rotation of the joint, to the quasi-passive elastic actuator coupled between the input and output members (e.g., because the clutch mechanism is in the semi-engaged state). "Semi-elastic," as used herein, is not intended to refer to the inherent elastic property (i.e., the elasticity) of the elastic component of the quasi-passive elastic actuator, but merely to a degree of compression of the elastic component.

In one example, the motor 312 can comprise a high-performance Permanent Magnet Brushless DC motor (PMBLDC). The motor 312 can comprise a stator 320 and rotor 322 rotatable relative to each other (in a typical fashion for commercially available frameless brushless motors). Thus, the motor 312 of the primary actuator 302 comprises a cylindrical void 324 about the central area of the rotor 322. Advantageously, the first planetary transmission 314 can be positioned (at least partially) within the cylindrical void 324 of the motor 312, which provides a low-profile, compact geared motor configuration because the first planetary transmission 314 and the motor 312 are packaged together, as shown and described (and similar to motor 212 and planetary transmission 214 of FIG. 5B). A transfer wheel 313 can be coupled to the rotor 322 via fasteners 319, so that rotation of the rotor 322 causes rotation of the transfer wheel 313 about the axis of rotation 310.

In the present example, the first planetary transmission 314 can comprise a 4:1 geared transmission, and can function as the planetary transmission 214 discussed above. Thus, as with transmission 214 of FIG. 5G, the first planetary transmission 314 can be nearly identical in structure and function as transmission 214. A sun gear 332 can be disposed centrally between four planet gears 330 and along the axis of rotation 310, with the sun gear 332 comprising teeth operable to engage the teeth of each of the four planet gears 330 that rotate around the sun gear 332 and about an outer housing 326. The outer housing 326 can be fastened to the second support frame 315b to hold it stationary. At the output of the first planetary transmission 314, the planet gears 330 are coupled to a carrier plate 334, which is coupled to a sun gear 346 of the second planetary transmission 316. The second planetary transmission 316 can be the same as or similar to the second planetary transmission 216 of FIG. 5B, such that the output of the second planetary transmission 316 is coupled to the output member 308b.

Therefore, upon receiving a control signal, the rotor 322 drives/rotates the transfer wheel 313, which rotates/drives the sun gear 332, which drives/rotates the carrier plate 334 (via planet gears 330). The carrier plate 334 then drives/rotates the sun gear 346 of the second planetary transmission 316, which ultimately drives/rotates the output member 308b via the output of the second planetary transmission 316. Accordingly, the present example provides a 16:1 final drive transmission from the motor 312 to the output member 308b. Other planetary transmission types and gear reduction schemes can be used instead of a 4:1 transmission, such as a 3:1 planetary gear scheme. Note that output member 308b is shown generically, but it could take other suitable forms and configurations for interfacing with the second planetary transmission 316 and with a robotic support member, for example.

To reduce build height, as well as to provide other advantages, the first planetary transmission 314 can be configured to be positioned inside of the rotor of the motor 312. Depending on the motor selected, the inside diameter of the rotor can dictate the maximum outside diameter of the planetary transmission. Once the planetary ring has been constrained by its outside diameter, there are a limited amount of options for gear ratios and output torques available. The output ratio is determined from the ratio of the number of teeth on the ring gear to the number of teeth on the sun gear. To obtain a higher reduction in the compact design of the planetary unit, the sun gear diameter can be reduced, which generally corresponds to less power transmission. The capacity to transmit higher torques is reduced with the smaller sun gear. A balance of reduction and strength can be found for a planetary unit that will physically fit inside the motor rotor. By implementing a helical cut gear, higher forces can be transmitted on the gear teeth or engagement features making the unit stronger. A wider tooth or engagement feature can also improve the load carrying capacity of the gear, however this can increase the weight as well. Multiple stages of a planetary transmission can be cascaded (e.g., 314 and 316) to produce extremely high gear reduction in a relatively compact package, particularly one about the axis of rotation of the joint. In addition, the sun gear can make contact with several teeth simultaneously so the contact ratio is much higher than a conventional spur gear transmission. In some examples, a single stage planetary transmission can achieve efficiency of around 97%. At higher RPM, gear noise can be an issue, especially for multiple stage planetary units. Another benefit of the planetary transmission is the fact that the transmission can be located in-line with the motor, which allows for compact mounting configurations within the joint module 300 of the robot or robotic assembly.

As illustrated, the motor 312, the first and second planetary transmissions 314 and 316, and the output member 308b can each operate or rotate about substantially the same axis of rotation as the axis of rotation 310 of the clutched quasi-passive actuator joint module 300 (i.e., the axis of rotation of the corresponding joint of the robot or robotic assembly), which axis of rotation in some cases, can also correspond to the axis of rotation of a human joint, such as an operator in an exoskeleton. Said another way, each axis of rotation of the motor 312, the first and second planetary transmissions 314 and 316, and the output member 308b can be arranged to be collinear or substantially collinear with the axis of rotation 310. This locates the mass of such components close or near to the axis of rotation of a particular joint, which further minimizes power requirements by the motor 312 to actuate the joint.

With particular reference to FIG. 6B, and as introduced above, the quasi-passive elastic actuator 304 is operable to apply an augmented torque to rotate the output member 308b along with the primary torque applied by the primary actuator 302, or to generate a braking force within the clutched joint module. Thus, the quasi-passive elastic actuator 304 is switchable between an elastic configuration, a semi-elastic configuration, and an inelastic configuration via operation of the clutch mechanism 306 for selectively controlling application of the augmented torque applied by the quasi-passive elastic actuator 304.

As in the example of FIGS. 5A-5E, the quasi-passive elastic actuator 304 can comprise an elastic element in the form of a torsional coil spring 305. One end of the torsional coil spring 305 can be coupled to a transfer shaft 307 and can be wound clockwise therefrom, and the other end can be coupled to the input member 308a (or to an intermediate component coupled between the torsional coil spring 305 and a suitable input member). The input member 308a can comprise an annular ring surrounding the torsional coil spring 305, or it can take other suitable forms as being coupled between the torsional coil spring 305 and a robotic support member. An output end of the transfer shaft 307 can be coupled to the transfer wheel 313, such that rotation of the transfer shaft 307 (e.g., an applied augmented torque) causes rotation of the transfer wheel 313, as detailed below. Note that the torsional coil spring 305 is only shown in FIG. 6B, but it will appreciated that it can be disposed between the transfer wheel 313 and the clutch mechanism 306 shown in the other Figures.

Turning to the clutch mechanism 306 of FIGS. 6D and 6E, an electromagnetic clutch is disclosed to operate in series with the quasi-passive elastic actuator 304 (although it can be operated in parallel, as exemplified below). The clutch mechanism 306 can comprise a clutch housing 321 including a first clutch frame 323a and a second clutch frame 323b coupled to each other and fastened to the first support frame 315a via fasteners 325. An annular collar 327 can be supported and surrounded by the first support frame 315a, and can comprise an L-shaped cross section (not shown) that receives an electromagnetic device 329, which is retained by a collection of the support frames 315a and 315b and the annular collar 327. The electromagnetic device 329 can comprise an electromagnetic coil or actuator that is electrically coupled to a controller and a power source (which can be part of an onboard control system of the exoskeleton of FIG. 4A).

A plate retention component 331 can be coupled to the second support frame 323b via fasteners 333 (e.g., radially disposed pins) seated in recesses of the plate retention component 331. The plate frame component 331 can be seated in an annular flange of the second support frame 323b. The clutch mechanism 306 can comprise a plurality of input plates 335a (e.g., four total) retained by the plate retention component 331. In this manner, the plate retention component 331 can comprise perimeter retaining features 337 (e.g., six recesses) formed annularly around an inside of the plate retention component 331 that receive and retain perimeter tabs or flanges 339 (six total) of each of the input plates 335a to restrict movement of the input plates 335a relative to the clutch housing 321.

A plurality of output plates 335b (e.g., four total) can each be slidably or frictionally interfaced (i.e., sandwiched between) with adjacent input plates 335a in an alternating manner (FIG. 6E). The output plates 335b can each have a curvilinear perimeter that is slidably supported within curved inner surfaces of the plate retention component 331. Each output plate 335b can comprise a central aperture 341 that engages with a clutch output shaft 343 having a corresponding size and shape (e.g., hexagon shaped central aperture and clutch output shaft 343). Thus, rotation of the output plates 335b causes concurrent rotation of the clutch output shaft 343. The clutch output shaft 343 is coupled to the transfer shaft 307 that is coupled to the quasi-passive elastic actuator 304 (FIG. 6B), such that rotation of the clutch output shaft 343 causes rotation of the transfer shaft 307 (which is coupled to the transfer wheel 313 discussed above). A cover plate 345 can be coupled to the plate retention component 331 to assist with retaining the plates 335a and 335b.

The output plates 335b can be comprised of a non-ferromagnetic material while the input plates 335b can be comprised of a ferromagnetic material. Upon receiving a clutch control signal (e.g., from a controller), the electromagnetic actuator 329 is activated to apply an electromagnetic field in a direction that tends to axially urge the input plates 335a along the axis of rotation 310, which thereby compresses the output plates 335b between the respective input plates 335a, such that the plates 335a and 335b are restricted from movement relative to the plate retention component 331 (which is attached to the clutch housing 321, and which is attached to the first support frame 315a). This is the engaged state of the clutch mechanism 306. Such restricted movement of the plates 335a and 335b thereby restricts movement of the clutch output shaft 343, which engages or otherwise activates the quasi-passive elastic actuator 304. Therefore, upon rotation of the input member 308a (either via the primary actuator or via application of an external force), and while the clutch mechanism 306 is in this engaged state, the quasi-passive elastic actuator 304 will therefore store energy or release energy (being in the elastic configuration), as described above, and depending upon the rotation of the input member 308a (e.g., clockwise rotation of FIG. 6B stores energy, while counterclockwise rotation releases energy, but opposing directions are not to be limiting as the storage and release of energy can occur in the same rotational direction). This action of the clutch can also be used to generate a braking force (i.e., compression of the elastic element generates a force that can be used to restrict movement of the output member relative to the input member). The electromagnetic actuator 329 can be selectively operated and controlled to apply a variable magnetic field and a variable compression force, such that the clutch mechanism 306 operates between a disengaged state, a semi-engaged state, and a fully engaged state to generate a variable braking force or a variable augmented torque. Indeed, in another aspect, with the clutch mechanism 306 operating in a semi-engaged state, movement between the input plates 335a and the output plates 335b can be partially restricted by the actuator 329 applying a smaller compression force to the input and output plates 335a, 335b, such that some movement between the input plates 335a and the output plates 335b is facilitated or caused to occur. In the engaged or the semi-engaged state, the clutch mechanism 306 and the quasi-passive elastic actuator 304 can function as a brake, or in other words, can provide a braking force operable to dissipate energy within the joint module, or these can function to apply an augmented torque to the output member. The degree or magnitude of the compression force applied by the actuator 329 to the input and output plates 335a, 335b can be dynamically controlled in real-time by controlling or varying the amount of force generated and applied by the actuator 329.

Conversely, upon receiving a clutch control signal, the electromagnetic actuator 329 can be caused to place the clutched mechanism 306 in the disengaged state. That is, a clutch control signal is received by the electromagnetic actuator 329, such that the applied electric field is removed, thereby releasing compression pressure applied by the input plates 335b. This allows the output plates 335b to freely rotate relative to the input plates 335a, This permits relatively "free swing" rotation of the input member 308a relative to the output member 308b, therefore placing the quasi-passive elastic actuator 304 in its inelastic state. Thus, the quasi-passive elastic actuator 304 exerts negligible resistance in this "free swing" mode, when the clutch mechanism is disengaged, so that the input and output members 308a and 308b can freely rotate relative to each other with minimal resistance. Furthermore, once stored, the energy can be dissipated at any time without being used either as a braking force or to apply an augmented torque, by disengaging the clutch mechanism 136.

When the clutch mechanism 306 is in the engaged or semi-engaged state, and the quasi-passive elastic actuator 304 is in the elastic or semi-elastic state, the augmented torque can be applied by the torsional coil spring 305. This augmented torque can be translated via the transfer shaft 307 to the sun gear 332 of the first planetary transmission 314 (FIG. 6B), and so on (as described above), to rotate the output member 308b. For example, assume the torsional coil spring is wound in the clockwise direction from the transfer shaft 307 (as shown), so that, upon a first clockwise rotation of the input member 308a about the axis of rotation 310, the torsional coil spring 305 stores energy Such rotational movement can be the result of a gait movement of the robotic assembly (e.g., of a lower body exoskeleton) that causes a first robotic support member (e.g., 104e) to rotate about a second robotic support member (e.g., 104d), such as during a gait cycle between point B to C, as shown in FIG. 2. Alternatively, such rotational movement can be the result of a shoulder or elbow movement of an exoskeleton during a certain task (e.g., downward movement of "push-ups" of an operator wearing an exoskeleton). Upon further rotation, or in the event of the disengagement of the clutch mechanism, such as in the counter-clockwise direction or depending upon the engaged state of the clutch mechanism, the quasi-passive elastic actuator 304 can release its stored energy, thereby transferring an augmented torque to rotate the output member 308b (as detailed above) or to apply a braking force. In one example, counterclockwise rotation can be about modules 104e and 104d (and between points A to B of FIG. 2), or, in the push-up example, such rotation can be during the upward movement of the push-up such that the energy stored during the downward push-up movement is recovered/released during the upward motion of the push-up.

Concurrently, and upon such rotation, the motor 312 of the primary actuator 302 can be operated to apply a primary toque (along with the augmented torque) to rotate the output member 308b about axis of rotation 310 to actuate the joint module 300. Because the primary torque applied by the motor 312 is supplemented with the augmented torque applied by releasing stored/recovered energy via the quasi-passive elastic actuator 304, the electric motor 312 can be selected from a group of smaller (e.g., less power dissipation) motors than would otherwise be needed, which contributes to the compact configuration of the joint module 300, as also discussed above.

The electromagnetic actuator 356 can receive a clutch control signal to move the clutch mechanism 306 to the disengaged state, as discussed above. As a result, the quasi-passive elastic actuator 304 can release any stored energy, and in this state neither stores nor releases energy (i.e., as it is in the inelastic configuration).

Alternatively, the clutch output shaft 343 can be coupled to an input sun gear 332) of the first planetary transmission 314, which would provide a parallel arrangement such as shown in FIG. 2B where the output of the quasi-passive actuator 304 (e.g., spring 129) is operatively coupled between the motor and the gear train. In another example of a parallel arrangement, the stator of the motor could be coupled to a body/housing of the clutch mechanism while one end of the quasi-passive actuator could be coupled to the rotor of the motor, and the other end of the quasi-passive actuator could be coupled to a sliding or rotating part of the clutch mechanism that may be disengaged or locked (i.e. coupled to the body of the clutch and at the same time to the stator of the motor).

In one example discussed above, clutch mechanism 306 can be controlled as a binary device (i.e., the clutch mechanism 306 is either on/engaged or off/disengaged) when applying a compression force to compress the plates together, and when removing the compression force to release compression between the plates. Alternatively, the clutch mechanism 306 can be configured and controlled as an analog device, meaning a variable electromagnetic force can be applied by the electromagnetic actuator 329 to compress the plates together to a varying degree to generate a braking force and to facilitate gradually storing energy or dissipating/releasing stored energy in a more controlled manner for damping or braking purposes (i.e., the clutch mechanism 136 is in a semi-engaged state and the quasi-passive elastic actuator 134 is in a semi-elastic state). In one example operational scenario, the clutch mechanism 306 can be fully engaged or semi-engaged such that the quasi-passive elastic actuator 304 at least partially stores energy. This stored energy can function to generate a braking force that can restrict rotation of the output member (e.g., such as in the case where the primary actuator is inactive and not producing a primary torque, yet rotation of the joint is still desired or needed (e.g., rotation of the joint under the influence of gravity or in response to some externally applied force to the robotic system)), or it can be released as an augmented torque to assist the primary actuator. Furthermore, in the event of the release of the energy as an augmented torque, when the quasi-passive elastic actuator 304 is releasing energy in the elastic or semi-elastic states (e.g., during a stance extension), the actuator 329 can be operated to cause slight compression of the plates together to generate a gradual "braking force" about the plates so that the augmented torque can be discharged or applied in a controlled, gradual manner. This can help to reduce the likelihood of applying a torque within the robotic system that may actuate the joint too quickly and with too much velocity at an initial stage of actuation (which, in the case of an exoskeleton type robotic system can cause discomfort to the operator and can disrupt a desired fluid/natural movement of an exoskeleton limb). This may also be advantageous when lowering a load with the robotic system, where it is desirable to lower the load in a controlled manner by controlling the amount of braking force applied by plates of one or more joint modules of the robotic system. Also in the case of an exoskeleton, this may also be advantageous when an operator moves from a crouching position while picking up a load (e.g., a person), and the stance extension may need to be slower or more controlled. In such a case, the plates of clutch mechanisms of the hip and/or knee clutched joint modules may then be controlled as brakes to controllably dissipate stored energy released by the associated quasi-passive elastic actuators.

Note that the quasi-passive elastic actuator 304 and the clutch mechanism 306 can be "coupled to" the input member 308a as shown, or at any point between various components situated between the input and output members, such as between the motor 312 and the output member 308b (and between or adjacent any one of the planetary transmissions).

As further explanation, and to further illustrate, the multi-plate configuration of the clutch mechanism 306 can act as a brake. This is achieved by controlling the compression force applied to the input and output plates 335a and 335b, thus providing a beneficial energy saving mode of operation. For instance, by controlling the braking force, the robotic system can be caused to lower a load subject to gravity by simultaneously controlling the brake force and the torque applied by the primary actuator (which in some cases can be zero), thus providing a very efficient mode of operation. The controlled braking can also be used to store energy in the elastic component of the quasi-passive elastic actuator. For example, an exoskeleton operator could lower him/herself to a squat position by letting part of his weight be supported by the exoskeleton while getting in the squat position. In this process, energy can be stored in the quasi-passive elastic actuator, while controlling the torque by controlling the braking force. At least some of the energy may then be recovered as the robotic device moves to the standing position, and additional torque may be provided, if required, by the primary actuator that would combine with the torque produced by the quasi-passive elastic actuator. In the latter example the clutch mechanism 306 can be used as a brake or as a clutch, or both.

In other examples, the quasi-passive elastic actuators discussed herein (i.e., 204 and 304) could be other types of springs, such as spiral torsion springs, negator/constant torque or laminar torque springs, air springs, planar spring, leaf springs, and the like.

Just as indicated above, various sensors, such as position sensors, force sensors, or both, can be operable within the joint module 300 to determine and measure a position or a force of the joint module 300, such that the quasi-passive actuator 304 can be engaged and disengaged as needed or desired. In one example, a position sensor 361 can be coupled to a sensor frame 363 that is coupled to the first support frame 315a. The position sensor 361 can assist to determine the position of the clutch output shaft 343, which assists to determine to the position of the input member 308a relative to the output member 308b. Other position sensors can be incorporated with the joint module 300 to assist with such determination, such as described with reference to FIG. 5A-5E.

In one aspect, the quasi-passive elastic actuator 304 can act as a gravity compensation mechanism to resist gravitational forces imposed on the robotic assembly, such as on an arm of an exoskeleton, so that the human operator does not need to use energy to hold the robotic arm at a desired location or orientation. This is because the torsional coil spring, for instance, can exert a counter biasing force away from or that acts against the gravitational pull (when the clutch is engaged) to maintain a certain position of the joint and the robotic support members coupled thereto (as well as the relevant part of an operator, if any, such as in the case of an exoskeleton).

Note that spring stiffness of the quasi-passive elastic actuator 304 is a function of the size, shape, material, etc, of the torsional coil spring, for instance. Thus, the magnitude of stiffness for a given joint module is selectable (during manufacture and selection of the torsional coil spring) for mission-specific payloads and terrain-specific gaits (or other movements) while the clutch mechanism can be controlled and operated to control when in time, or at what rotational positions/forces during the various rotational movements of the joint module 300 that the quasi-passive elastic actuator 304 is to be engaged for energy recovery/release during the support phase (i.e., the elastic configuration), for instance, and when it is disengaged so as to enter the free swinging phase (i.e., the inelastic configuration). Moreover, due to the nature of torsional coil springs, for instance, the greater the degree of rotation during energy storage, the amount of energy stored exponentially increases (as torsional coil springs can store energy in a nonlinear manner). In this manner, the torsional coil spring can act somewhat as a compressed gas chamber in terms of storing and releasing energy, but without the complexity of some pneumatic spring actuators.

Figure 7B:
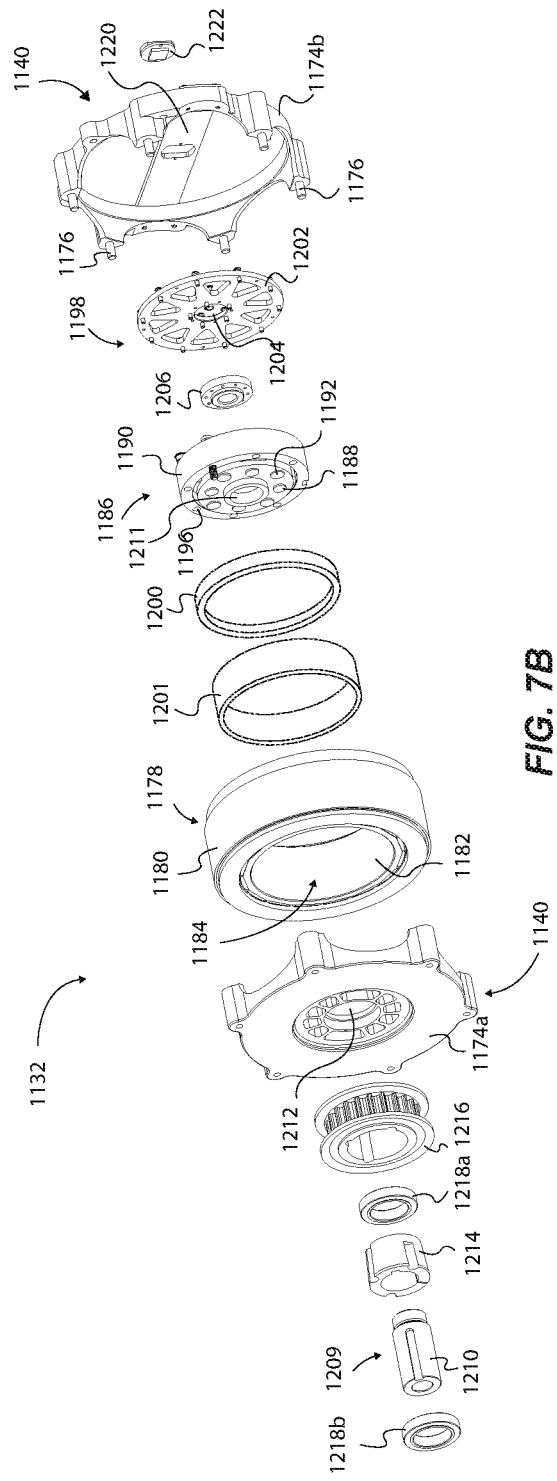
FIG. 7B is an exploded view of a primary actuator of the clutched joint module of FIG. 7A.

FIG. 7A illustrates a clutched actuator module 1130 in accordance with an example of the present disclosure, and FIG. 7B illustrates a primary actuator of the clutched actuator module 1130. The clutched actuator joint module 1130 can comprise the clutch mechanism 206 and the quasi-passive elastic actuator 204 described with reference to FIGS. 5A-5E positioned off-axis relative to an axis of rotation 1203 of a primary actuator 1132. That is, an axis of rotation 1137 of components of the clutch mechanism 206 can be generally parallel to the axis of rotation 1203 of the primary actuator 1132. Here, the output shaft 1208b can be coupled to an output of the clutch mechanism 206 (e.g., the rotary transfer component 240 of FIG. 5D). A transmission device or belt 1224 can be coupled to the clutch mechanism 206 via a splined ring gear (not shown) fastened or formed as part of the outer surface area of the movable engagement component 254 (see e.g., FIGS. 5D and 5E for a better view and understanding). Alternatively, the transmission belt 1224 could be directly coupled to the output shaft 1208b (e.g., the clutch mechanism 206 may need to be rotated 180 degrees from the orientation shown in FIG. 7A to accommodate such coupling between the belt 1224 and the output shaft 1208b). In either scenario; the transmission belt 1244 can transfer a torque to the output shaft 1208b to actuate the joint. Although not shown to scale, the left end of the output shaft 1208b can be rotatably interfaced to and through an aperture 1152 of a support frame 1138b, and then can be coupled to an output member that is coupled to a robotic support member, or it can be coupled directly to the robotic support member. Thus, as further detailed above regarding FIGS. 5A-5E, rotation of the input member 208a causes rotation of the movable engagement component 254, which causes rotation of the rotary transfer component, which causes rotation of the output shaft 1208b to rotate a particular joint of a robotic system, for instance.

More specifically regard this alternative configuration, the primary actuator 1132 (e.g., a geared electric motor) is operable to apply a torque to the output member 1208b (via the clutch mechanism, for instance) for rotation about the axis of rotation 1137, and the quasi-passive elastic actuator 204 (e.g., a torsional coil spring) is selectively operable (via operation of the clutch) to apply an augmented torque to the output member 1208b along with the torque applied by the primary actuator 1132 to actuate the joint during a certain portion of a gait movement (or other movement of an exoskeleton limb, such as the an upper body movement).

The clutch mechanism 206 can be structurally mounted to the primary actuator 1132 by a first mounting plate 1138a and a second mounting plate 1138b; each positioned on either side so as to constrain the primary actuator 1132 and the clutch mechanism 206 in a "sandwich" state. Although not shown here; the housing 215b of the clutch mechanism 206 can have support members extending outwardly therefrom and can be coupled and supported by the first and second mounting plates 1138a and 1138b in a suitable manner. Other suitable means of coupling the clutch mechanism 206 to the support plates are possible and contemplated herein.

The first mounting plate 1138a can be mounted to a housing mount 1140 (that supports the primary actuator 1132) via a plurality of fasteners 1142 (with spacers there between). The second mounting plate 1138b is mounted to the other side of the housing mount 1140 via a plurality of fasteners 1151.

The output shaft 1208b (and/or an output member coupled to the shaft 1208b) can be a load transfer component that can comprise many different shapes and forms, depending upon the particular application (e.g., exoskeleton, humanoid robot, robotic hand or arm). As such, the specific configurations shown are not intended to be limiting in any way. The output shaft 1208b can comprise a robotic support member interface portion coupleable to a support structure of a robotic assembly, such as the exoskeleton of FIG. 4A.

The housing mount 1140 can comprise a first mount structure 1174a and a second mount structure 1174b coupled to each other via fasteners. The first and second mount structures 1174a and 1174b are fastened together to house and structurally support many of the components of the primary actuator 132. For instance, the primary actuator 1132 comprises a motor 1178 (e.g., electric motor) that is seated in the first and second mount structures 1174a and 1174b. The motor 1178 can be a high-performance Permanent Magnet Brushless DC motor (PM-BLOC), which can be a variant of a frameless torque motor with winding optimized to achieve the desired maximum torque and speed while operating using a 48 VDC supply and a high-performance COTS controller, such as motor MF0127-032 marketed by Allied Motion. The motor described above and shown in the drawings is not intended to be limiting in any way. Indeed, other motors suitable for use within the primary actuator 1132 are contemplated herein, as are various other types of actuators, such as hydraulic actuators.

As further shown in FIG. 7B, the motor 1178 can comprise a stator 1180 and rotor 1182 rotatable relative to each other (in a typical fashion for commercially available frameless brushless motors). Note that the view of FIG. 7B is inverted relative to the view initially shown in FIG. 7A of the primary actuator 1132. The motor 1178 can be configured to comprise a central void 1184 about the central area of the motor 1178 and surrounded by the rotor 1182. Advantageously, a planetary transmission 1186 can be positioned within (entirely or partially) the central void 1184 (although other transmission types mentioned herein could be utilized). This provides a low-profile geared motor state with high torque output for a relatively small electric motor, as exemplified elsewhere herein. It should be appreciated that the planetary transmissions exemplified herein can be replaced (or supplemented with) other transmission types, such as harmonic, cycloidal, worm, belt/chain, crank, four-bar linkage, backhoe linkage, bell crank, and continuously variable, for instance.

Planetary transmissions are well known and will not be discussed in great detail. However, in the present example the planetary transmission 1186 can be configured as a 4:1 geared planetary transmission. Thus, in one example the planetary transmission 1186 can comprise an outer ring 1190 engaged to four planet gears 1188 (one labeled) mounted about a carrier 1192, whereby the four planet gears 1188 have gear teeth that engage with the gear teeth of a central sun gear (not visible from this view). In the present example, the outer ring 1190 is stationary, as it is fastened to the first mount structure 1174a via fasteners (not shown) through apertures around the outer ring 1190 and into threaded bores in the first mount structure 1174a. A rotatable transfer wheel 1198 is disposed on an outer side of the primary actuator 1132 adjacent the second mount structure 1174b, and is fastened to a drive collar 1200 via perimeter fasteners. The drive collar 1200 is fastened or fixed to the rotor 1182 of the motor 1178. The transfer wheel 1198 is operable to transfer rotation from the rotor 1182 of the motor 1178 to the sun gear (of transmission 1186) about the axis of rotation 1203 (FIG. 7A). A spacer sleeve 1201 can be positioned adjacent the drive collar 1200 and between the outer ring 1190 of the planetary transmission 1186 and the rotor 1182 to act as a support spacer between the planetary transmission 1186 and the rotor 1182. Certain other details and the configuration of FIGS. 7A and 7B if also described in U.S. patent application Ser. No. 15/810,108, filed Nov. 12, 2017, which is incorporated by reference in its entirely herein.

The transfer wheel 1198 can comprise a central aperture 1204 that supports a transfer hub 1206 that is fastened to the transfer wheel 1198 via fasteners. The transfer hub 1206 can have inner gear teeth (not shown) that can be engaged with outer gear teeth of the sun gear. Therefore, upon applying an electric field to the motor 1178, the rotor 1182 rotates about axis 1203, which causes the transfer wheel 1198 to rotate, which thereby causes the sun gear 1194 to rotate, all in a 1:1 ratio. Upon rotation of the sun gear about axis of rotation 1203, the planetary gears 1188 rotate around the sun gear, which causes the carrier 1192 to rotate. An output shaft 1209 is secured to a central portion 1211 of the carrier 1192, such that rotation of the carrier 1192 causes rotation of the output shaft 1209 about axis 1203, which provides a 4:1 geared-down transmission arrangement from rotation of the rotor 1182 to the output shaft 1209 via the planetary transmission 1186, Other planetary transmission types and gear reduction schemes can be used instead of a 4:1 transmission, such as a 3:1 or a 5:1 (or even greater ratios) planetary gear scheme.

To reduce build height, the planetary transmission 1186 can be positioned inside of the rotor 1182 of the motor 1178. Depending on the motor selected, the inside diameter of the rotor will dictate the maximum outside diameter of the planetary transmission. Once the planetary ring has been constrained by its outside diameter, there are a limited amount of options for gear ratios and output torques available. The output ratio is determined from the ratio of the number of teeth on the ring gear to the number of teeth on the sun gear. To obtain a higher reduction in the compact design of the planetary unit, the sun gear diameter can be reduced, which generally corresponds to less power transmission. The capacity to transmit higher torques is reduced with a smaller sun gear. A balance of reduction and strength can be determined for a planetary unit that will physically fit inside the motor rotor. By implementing a helical cut gear, higher forces can be transmitted on the gear teeth making the unit stronger. A wider tooth will also improve the load carrying capacity of the sun gear, however this increases the weight as well.

In addition, the sun gear makes contact with several teeth simultaneously so the contact ratio is much higher than a conventional spur gear transmission. Another benefit of planetary gears is the fact that the transmission is in-line with the motor, which allows for compact mounting states. Two of the 4:1 planetary units can be nested together to produce a 16:1 final drive, for instance.

Thus, in one example using Allied Motion's MF0127-032 motor, it has an inside diameter of 3.3 inches, which means that a planetary transmission of approximately 3.15 inches (or less) could be used and disposed in the central void of the motor. And, Matex's 75-4MLG12 planetary transmission can be incorporated, which is a 4:1 unit with a 2.95 inch outside diameter having a 118 N-m peak torque, weighing just 500 grams. Such planetary transmission could be incorporated with a brushless motor as discussed herein to generate a compact configuration. Therefore, in the illustrated example of FIG. 7B, the output shaft 1209 applies a relatively higher torque at a low speed with very little noise and backlash via the planetary transmission 1186, all in a compact form because the planetary transmission 1186 is housed within the void 1184 of the brushless frameless electric motor 1178, for instance. It is noted that the specific types of motors and planetary transmissions described herein are not intended to be limiting in any way, as will be recognized by those skilled in the art.

With continued reference to FIGS. 7A and 7B a free end 1210 of the output shaft 1192 extends through an aperture 1212 of the first mount structure 1174*a*. A tapered support collar 1214 surrounds and is coupled to the output shaft 1192 (a key and slot interface can be used to couple the support collar 1214 to the output shaft 1192). The tapered support collar 1214 has an outer tapered surface that mates to an inner tapered surface of a primary pulley 1216 (e.g., such as a Morse taper interface) to couple the output shaft 1192 to the primary pulley 1216 (a key and slot interface can be used to couple the support collar 1214 to the primary pulley 1216). A first collar bearing can be positioned within the aperture 1212 (FIG. 7A) of the first mount structure 1174*a* to rotatably support the output shaft 1192, and a second collar bearing 218*b* can be positioned with an outer end of the primary pulley 1216 to rotatably support the free end 1210 of the output shaft 1192.

In one example, a sensor plate 1220 can be fastened to an outer side of the second mount structure 1174*b*, and has an aperture that supports a position sensor 1222. The position sensor 1222 is adjacent the transfer wheel 1198, which has an aperture through to the sun gear 1194 to allow the position sensor 1222 to determine the position of the sun gear 1194, which can ultimately determine the rotational position of the output shaft 1209, thereby providing the angular position of a knee or hip joint, for instance. The position sensor 1222 can be any suitable sensor, such as a 13-bit hall-effect sensor. Additional positions sensors can be coupled to the system, and utilized to ultimately determine the position of the joint. The particular position of an exoskeleton joint is relevant in determining and controlling actuation of the clutch mechanism to switch the quasi-passive elastic actuator between the inelastic and elastic states, or to dynamically vary a zero point or position of the elastic actuator, as further discussed herein.

Upon rotation of the output shaft 1209 (in either rotational direction) by operating the motor 1178, the primary pulley 1216 rotates the transmission belt 1224 that is coupled to the clutch mechanism 136 (or output shaft 1208*b*), as discussed above, to provide a primary torque to rotate the output shaft 1208*b* to actuate a robotic joint, for instance. The transmission belt 1224 can be a Gates Poly Chain GT Carbon synchronous belt, or other suitable belt. A belt tensioning device 1225 (FIG. 7A) can be adjustably slidably coupled to a slot of the first mounting plate 1138*a* via a fastener, which is operable by a user with a tool to slide the belt tensioning device 1225 toward or away from the belt 1224 to tighten or loosen the belt 1224, as desired. In some examples, various other torque-transmitting devices can replace the particular configuration of the belt 1224, such as one or more belts or linkages or gears or tendons (or combinations of such), and such alternatives can be arranged to have an axis of rotation that is orthogonal to the axis of rotation 1203 of the primary actuator 1132 (or some other angle other than parallel). And, various transmissions can be arranged to provide a relatively high gear reduction from input to output (e.g., 20:1, or more), or a relatively low gear reduction (e.g., 1:1), depending on the particular application. In some examples, such various alternative torque-transmitting devices can allow the primary actuator 1132 to be remotely located away from the output. For instance, the primary actuator 1132 could be located at a lower back area of an exoskeleton (e.g., FIG. 4A), while such alternative torque-transmitting device(s) could transfer the primary toque from the lower back area to an output member located adjacent the hip joint for actuating the hip joint, for instance.

It should be appreciated that the clutch mechanism 306 and the quasi-passive elastic actuator 304 discussed regarding FIGS. 6A-6B could readily replace the clutch mechanism 206 and quasi-passive elastic actuator 204 of FIG. 7A, and can be mounted to the mounting plates in a similar or different manner and can be operatively coupled to the primary actuator 1132 via a transmission belt (or other transmission) in a similar way as described regarding FIGS. 7A and 7B.

It is also noted that the various functions and operational states of the clutch mechanism 206 and the quasi-passive elastic actuator 204 described above with respect to FIGS. 5A-5E are applicable to the clutched joint module 1130. As such, these are not described again here, but those skilled in the art will recognize that upon reading the description above as it pertains to FIGS. 5A-5E that the clutched joint module 1130 can be operated in the same or a similar manner. Likewise, with the clutch mechanism 306 and the quasi-passive elastic actuator 304 replacing the clutch mechanism 206 and quasi-passive elastic actuator 204 of FIG. 7A the various functions and operational states of the clutch mechanism 306 and the quasi-passive elastic actuator 304 described above with respect to FIGS. 6A-6G are applicable to the clutched joint module 1130. As such, these are not described again here, but those skilled in the art will recognize that upon reading the description above as it pertains to FIGS. 6A-6G that the clutched joint module 1130 can be operated in the same or a similar manner.

It is further noted that rotation of the joints (i.e., relative rotation between the input and output members) defined by the various clutched joint modules discussed herein can be in any direction (e.g., the same direction, different directions) during the storing and releasing of the energy, during the generation and application of a braking force, as well as the disengagement of the clutch mechanism to facilitate free swing of the joint. In other words, the clutch mechanism can be operated to engage to store energy, to release energy, or to disengage to facilitate free swing of the joint upon rotation of an associated joint in the same direction or in various different directions. This is the case for all of the examples set forth in the present disclosure.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention, One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for configuring a clutched joint module for use within a robotic system, the method comprising:
   configuring an output member to couple to a first support member of a robotic system;
   configuring an input member to couple to a second support member of the robotic system;
   configuring a primary actuator to apply a primary torque to the output member to rotate the first and second support members relative to one another about an axis of rotation of the clutched joint module;
   coupling a quasi-passive elastic actuator to the input member;
   configuring the quasi-passive elastic actuator, upon select operation of the clutched joint module, to apply an augmented torque to the output member that combines with the primary torque applied by the primary actuator to rotate the output member about the axis of rotation;
   coupling a clutch mechanism to the primary actuator and the quasi-passive elastic actuator, such that the primary actuator comprises a primary axis of rotation substantially collinear with the axis of rotation of the clutched joint module; and
   configuring the clutch mechanism, upon select operation of the clutched joint module, to operate in an engaged state and a disengaged state, wherein, in the engaged state, the clutch mechanism operates to place the quasi-passive elastic actuator in an elastic state, and to facilitate application of the augmented torque.

2. The method of claim 1, wherein in the disengaged state, the clutch mechanism operates to place the quasi-passive elastic actuator in an inelastic state.

3. The method of claim 1, further comprising configuring the quasi-passive elastic actuator to comprise an elastic component in the form of a mechanical elastic component.

4. The method of claim 1, further comprising configuring the quasi-passive elastic actuator to comprise an elastic component in the form of a torsional coil spring.

5. The method of claim 1, further comprising configuring the clutch mechanism to have a clutch axis of rotation substantially collinear with the axis of rotation of the clutched joint module.

6. The method of claim 1, further comprising coupling a transmission between the primary actuator and the output member, and configuring the transmission to be operable about the axis of rotation of the clutched joint module.

7. The method of claim 6, further comprising configuring the clutch mechanism, the primary actuator, and the transmission to be arranged and operable about the axis of rotation of the clutched joint module.

8. The method of claim 6, further comprising configuring the transmission to be at least partially disposed within a central void of the primary actuator.

9. The method of claim 1, further comprising configuring at least one of the clutch mechanism or the quasi-passive elastic actuator to operate, in the elastic state, as a brake to restrict rotation between the input and output members upon a select operation of the clutched joint module.

10. The method of claim 1, further comprising configuring the clutch mechanism to comprise a semi-engaged state, and further comprising configuring the clutch mechanism to comprise:
   a clutch housing coupled to the input member;

a plurality of input plates retained by the clutch housing;
a plurality of output plates rotatably supported by the clutch housing and rotatably interfaced with the plurality of input plates in an alternating manner; and
an electromagnetic actuator coupled to the clutch housing and operable to apply selective, variable compression to the output plates and the input plates to cause the clutch mechanism to function in the engaged or semi-engaged state where at least one of a braking force is generated or the augmented torque is applied to the output member upon a select operation of the clutched joint module.

11. The method of claim 10, further comprising configuring the clutch mechanism to comprise a clutch output shaft coupled to the output plates and to be freely movable relative to the input plates, such that, when the clutch mechanism is in the disengaged state, the output plates freely rotate relative to the input plates.

12. The method of claim 11, further comprising configuring the quasi-passive elastic actuator to comprise an elastic component in the form of a torsional coil spring, wherein one end of the torsional coil spring is coupled to a transfer shaft coupled to the clutch output shaft and coupled to the primary actuator, and wherein the other end of the torsional coil spring is coupled to the input member.

13. The method of claim 12, further comprising configuring the primary actuator to comprise an electric motor, and further comprising configuring the clutched joint module to comprise a transmission operatively coupled to the electric motor and the transfer shaft.

14. The method of claim 13, further comprising configuring the electric motor, the transfer shaft, the clutch output shaft, and the transmission to each rotate about the axis of rotation of the clutched joint module.

15. A method for configuring a robotic system to minimize power consumption, the method comprising:
configuring a plurality of support members;
configuring a plurality of clutched joint modules to each rotatably couple together at least two of the plurality of support members;
configuring each clutched joint module to comprise:
a joint rotatable about an axis of rotation and defining a degree of freedom of the robotic system;
a primary actuator operable to apply a primary torque to rotate the joint;
a quasi-passive elastic actuator operable to apply an augmented torque that combines with the primary torque from the primary actuator to rotate the joint; and
a clutch mechanism coupled to the primary actuator and the quasi-passive elastic actuator, the clutch mechanism operable in an engaged state and a disengaged state, wherein, in the engaged state, the clutch mechanism operates to place the quasi-passive elastic actuator in an elastic state, and to facilitate application of the augmented torque,
wherein the primary actuator of at least one clutched joint module of the plurality of clutched joint modules comprises a primary axis of rotation substantially collinear with the axis of rotation of the joint of the at least one clutched joint module.

* * * * *